US009380449B2

(12) United States Patent
Fong et al.

(10) Patent No.: US 9,380,449 B2
(45) Date of Patent: Jun. 28, 2016

(54) CLOSED SUBSCRIBER GROUP MEASUREMENT REPORTING

(75) Inventors: Mo-Han Fong, Ottawa (CA); David Philip Hole, Southampton (GB); Jeffrey William Wirtanen, Kanata (CA); Johanna Lisa Dwyer, Ottawa (CA); Young Ae Kim, Hellandale, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 437 days.

(21) Appl. No.: 13/434,355

(22) Filed: Mar. 29, 2012
(Under 37 CFR 1.47)

(65) Prior Publication Data

US 2012/0244903 A1    Sep. 27, 2012

Related U.S. Application Data

(63) Continuation of application No. PCT/US2010/051225, filed on Oct. 1, 2010.

(60) Provisional application No. 61/248,406, filed on Oct. 2, 2009.

(51) Int. Cl.
*H04B 7/00* (2006.01)
*H04M 1/00* (2006.01)
*H04W 8/20* (2009.01)
*H04W 24/10* (2009.01)
*H04W 48/02* (2009.01)
*H04W 84/04* (2009.01)

(52) U.S. Cl.
CPC ............... *H04W 8/20* (2013.01); *H04W 24/10* (2013.01); *H04W 48/02* (2013.01); *H04W 84/045* (2013.01)

(58) Field of Classification Search
CPC ..................................................... H04W 24/30
USPC .......................... 455/436, 434, 517, 525, 524
See application file for complete search history.

(56) References Cited

U.S. PATENT DOCUMENTS

| 8,254,923 | B2 * | 8/2012 | Jung et al. ..................... 455/434 |
| 8,310,946 | B2 * | 11/2012 | Somasundaram et al. ..... 370/252 |
| 8,588,773 | B2 * | 11/2013 | Deshpande et al. .......... 455/434 |
| 2009/0238117 | A1 * | 9/2009 | Somasundaram et al. .... 370/328 |

(Continued)

FOREIGN PATENT DOCUMENTS

| EP | 1120939 A1 | 8/2001 |
| WO | 9914974 A1 | 3/1999 |

(Continued)

OTHER PUBLICATIONS

Research In Motion Limited; PCT International Search Report; PCT Application No. PCT/US2010/051225; Dec. 15, 2010; 5 pgs.

(Continued)

*Primary Examiner* — Tilahun B Gesesse
(74) *Attorney, Agent, or Firm* — Conley Rose, P.C.; J. Robert Brown, Jr.

(57) ABSTRACT

A system and method for mobility in a wireless network are presented. A user equipment with a processor configured to inform a network component of a closed subscriber group (CSG) capability of the UE. The processor informs the network component during capability exchange signaling. The processor informs the network component whether the UE is capable of detecting a CSG cell and whether the UE is a member of at least one CSG.

9 Claims, 6 Drawing Sheets

(56) References Cited

U.S. PATENT DOCUMENTS

| | | | |
|---|---|---|---|
| 2009/0247150 A1 | 10/2009 | Fischer et al. | |
| 2010/0029274 A1* | 2/2010 | Deshpande et al. | 455/435.3 |
| 2010/0197310 A1* | 8/2010 | Jung et al. | 455/436 |
| 2010/0240373 A1* | 9/2010 | Ji et al. | 455/436 |
| 2010/0291927 A1* | 11/2010 | Wu et al. | 455/435.3 |

FOREIGN PATENT DOCUMENTS

| | | | | |
|---|---|---|---|---|
| WO | 2009022976 A1 | 2/2009 | | |
| WO | 2009044318 A2 | 4/2009 | | |
| WO | WO 2009/044318 A2 * | 4/2009 | | H04W 24/00 |
| WO | 2009107950 A2 | 9/2009 | | |

OTHER PUBLICATIONS

Research In Motion Limited; PCT Written Opinion of the International Searching Authority; PCT Application No. PCT/US2010/051225; Dec. 15, 2010; 8 pgs.

Research In Motion Limited; PCT International Search Report; PCT Application No. PCT/US2010/051219; May 23, 2011; 8 pgs.

Research In Motion Limited; PCT Written Opinion of the International Searching Authority; PCT Application No. PCT/US2010/051219; May 23, 2011; 13 pgs.

Research In Motion Limited; PCT International Search Report; PCT Application No. PCT/US2010/051222; May 2, 2011; 5 pgs.

Research In Motion Limited; PCT Written Opinion of the International Searching Authority; PCT Application No. PCT/US2010/051222; May 2, 2011; 7 pgs.

Research In Motion Limited; PCT International Search Report; PCT Application No. PCT/US2010/051224; Apr. 18, 2011; 5 pgs.

Research In Motion Limited; PCT Written Opinion of the International Searching Authority; PCT Application No. PCT/US2010/051224; Apr. 18, 2011; 7 pgs.

Nokia Corporation, et al.; 3GPP TSG-RAN WG2 Meeting #67; Title: Inbound Mobility Towards UTRA CSG Cells; R2-094601; Shenzhen, China; Aug. 24-28, 2009; 4 pgs.

NTT DOCOMO, Inc.; 3GPP TSG-RAN WG2 #67; Title: Preliminary Access Check; R2-094944; Shenzhen, China; Aug. 24-28, 2009; 2 pgs.

Qualcomm; 3GPP TSG-RAN WG2 #67; Title: Inbound CSG Mobility UMTS; R2-094820; Shenzhen, China; Aug. 24-28, 2009; 17 pgs.

Motorola; 3GPP TSG-RAN WG2 #67; Title: Inbound CSG Mobility LTE; R2-094632; Shenzhen, China; Aug. 24-28, 2009; 28 pgs.

Qualcomm Europe; 3GPP TSG-RAN2 WG2 #67; Title: CR Capturing HNB Inbound Mobility Agreements; R2-095021; Shenzhen, China; Aug. 24-30, 2009; 4 pgs.

Qualcomm Europe; 3GPP TSG-RAN2 WG2 #67; Title: CR Capturing HNB Inbound Mobility Agreements; R2-095356; Shenzhen, China; Aug. 24-30, 2009; 5 pgs.

Samsung; 3GPP TSG RAN WG2 #65 bis; Title: Hybrid Cell and PCI-split; R2-092405; Seoul, South Korea; Mar. 23-27, 2009; 3 pgs.

Telecom Italia, AT&T, Qualcomm Europe, Samsung; 3GPP TSG-RAN WG2 Meeting #63; Title: Way Forward for Handover to HeNB; R2-084736; Jeju, Korea; Aug. 18-22, 2008; 2 pgs.

Telecom Italia, AT&T, Qualcomm Europe, Samsung; 3GPP TSG-RAN WG2 Meeting #63; Title: Way Forward for Handover to HeNB; R2-084534; Jeju, Korea; Aug. 18-22, 2008; 2 pgs.

Qalcomm Europe; 3GPP TSG RAN WG2 62bis; Title: Optimized Handover in the Presence of PCI Confusion; R2-083268; Warsaw, Poland; Jun. 30-Jul. 4, 2008; 5 pgs.

Nokia Corporation, et al.; 3GPP TSG-RAN WG2 Meeting #59bis; Title: CSG Cell Identification for Mobility and Measurement Reporting; R2-074882; Jeju, South Korea; Nov. 5-9, 2007; 2 pgs.

ETSI TS 122 220 v9.1.1; Technical Specification Universal Mobile Telecommunications System (UMTS); Service Requirements for Home Node B (HNB) and Home eNode B (HeNB); Release 9; Jul. 2009; 24 pgs.

ETSI TS 122 011 v8.8.0; Technical Specification Digital Cellular Telecommunications System (Phase 2+); Universal Mobile Telecommunications System (UMTS); LTE; Service Accessibility; Release 8; Jun. 2009; 27 pgs.

Ericsson; 3GPP TSG-SA5 (Telecom Management) Meeting SA5#53; Title: Discussion on Automatic Neighbour Relation Lists for LTE; S5-070962; Sophia Antipolis, France; May 7-11, 2007; 4 pgs.

\* cited by examiner

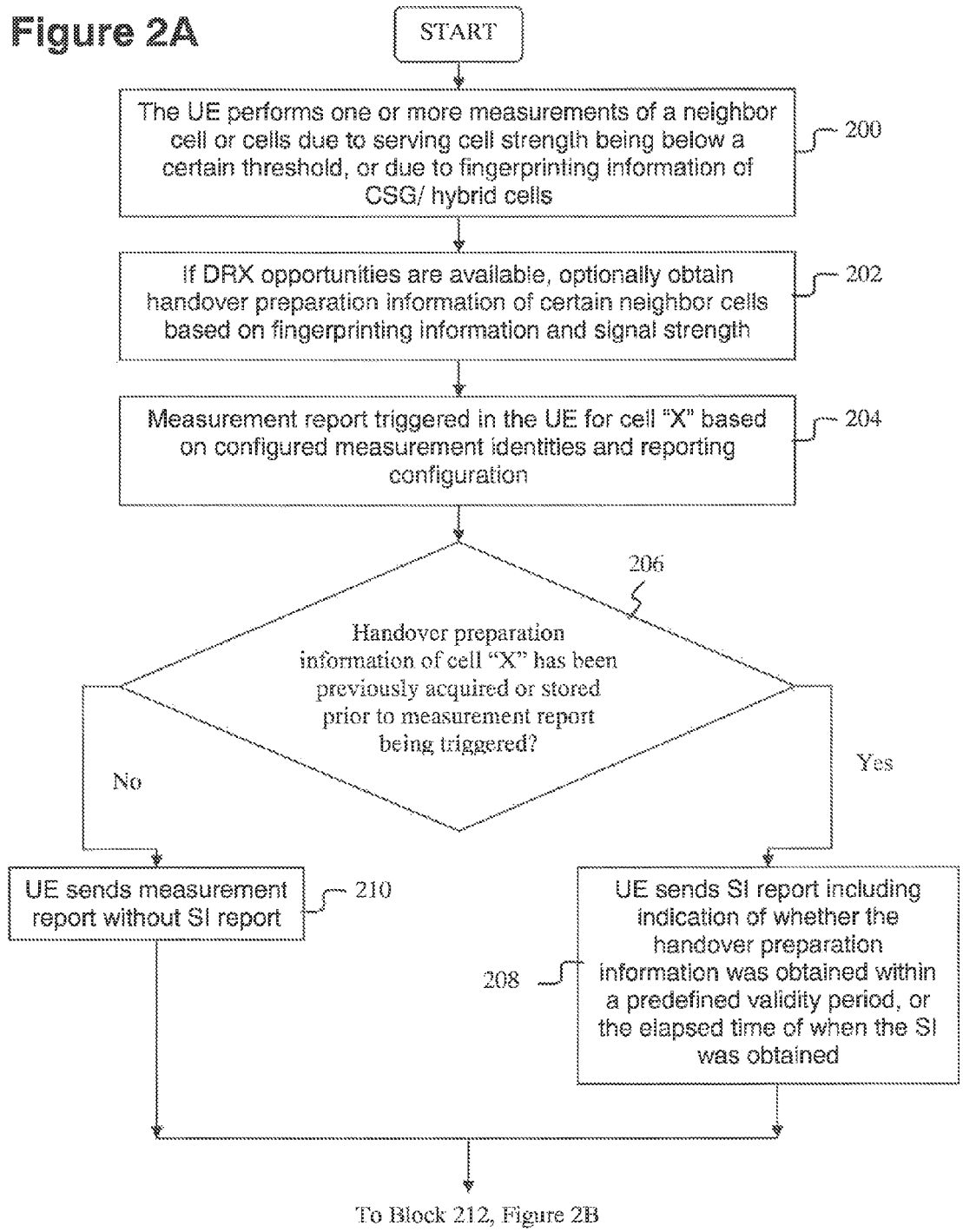

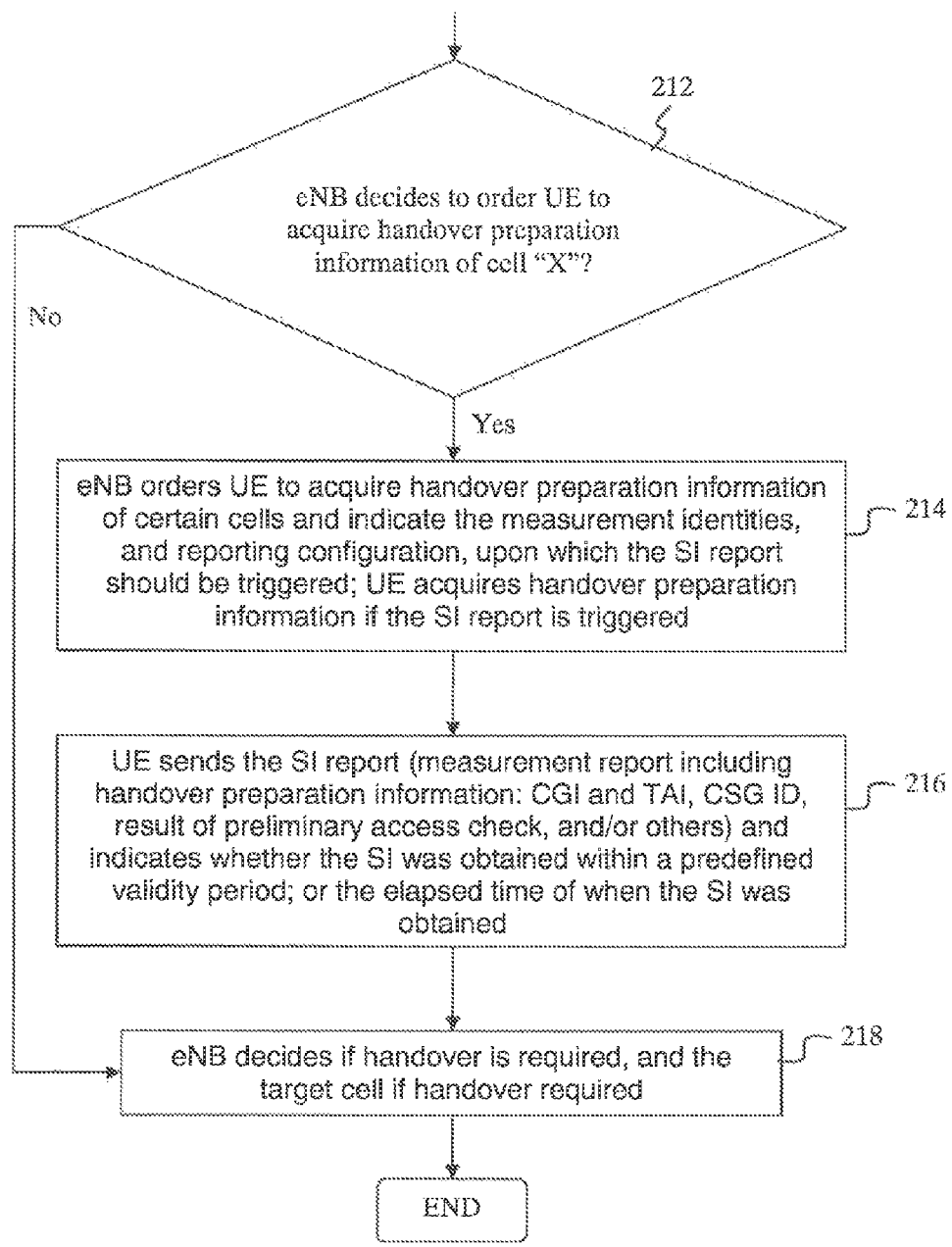

CLOSED SUBSCRIBER GROUP MEASUREMENT REPORTING

CROSS-REFERENCE TO RELATED APPLICATIONS

This application is a continuation application of International Application No, PCT/US2010/051225 filed Oct. 1, 2010, entitled "Mobility In A Wireless Network," (36803-WO-PCT—4214-20701) claiming priority from U.S. Provisional Patent Application No. 61/248,406 filed Oct. 2, 2009 (36803-US-PRV—4214-20700) which applications are incorporated by reference herein in their entirety.

BACKGROUND

As used herein, the terms "user equipment" ("UE"), "mobile station" ("MS"), and "user agent" ("UA") might in some cases refer to mobile devices such as mobile telephones, personal digital assistants, handheld or laptop computers, and similar devices that have telecommunications capabilities. The terms "MS," "UE," "UA," user device," and "user node" may be used synonymously herein. A UE might include components that anew the UE to communicate with other devices, and might also include associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and include an E-UTRAN node B (or eNB), a wireless access point, or a similar component rather than a traditional base station. As used herein, the term "access node" refers to any component of the wireless network, such as a traditional base station, a wireless access point, or an LTE or LTE-A node B or eNB, that creates a geographical area of reception and transmission coverage allowing a UE or a relay node to access other components in a telecommunications system. In this document, the term "access node" and "access device" may be used interchangeably, but it is understood that an access node may comprise a plurality of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2A is a flowchart illustrating steps involved in signal strength measurement, handover evaluation, and reporting, in accordance with an embodiment of the disclosure.

FIG. 2B is a flowchart illustrating steps involved in signal strength measurement, handover evaluation, and reporting, in accordance with an embodiment of the disclosure.

DETAILED DESCRIPTION

Figure 1:
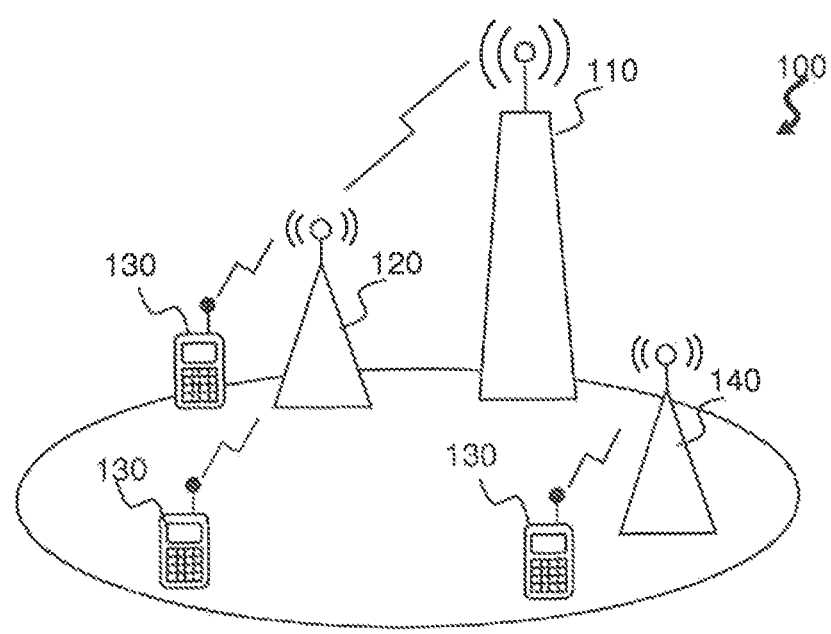
FIG. 1 is a diagram of a communication system, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and Figures, the following acronyms have the following definitions. Unless stated otherwise, all terms are defined by and follow the standards set forth by the Third Generation Partnership Program (3GPP) technical specifications.

"AS" is defined as "Access Stratum."
"CGI" is defined as "Cell Global Identification,"
"CP" is defined as "Client Provisioning,"
"CSG" is defined as "Closed Subscriber Group."
"DM" is defined as "Device Management."
"DRX" is defined as "Discontinuous Reception."
"E-CGI" is defined as "Extended CGI"
"eNB" is defined as "E-UTRAN Node B."
"EUTRA" is defined as "Evolved Universal Terrestrial Radio Access,"
"EUTRAN" is defined as "E-UTRA Network."
"HeNB" is defined as "Home eNB."
"IE" is defined as "Information Element,"

"LTE" is defined as "Long Term Evolution."
"LTE-A" is defined as "LTE-Advanced,"
"MIB" is defined as "Master Information Block."
"MME" is defined as "Mobility Management Entity,"
"NAS" is defined as "Non Access Stratum."
"OMA" is defined as "Open Mobile Alliance."
"PCI" is defined as "Physical Cell Identity,"
"PSC" is defined as "Primary Synchronization Code."
"RAN" is defined as "Radio Access Network."
"RN" is defined as "Relay Node,"
"RRC" is defined as Radio Resource Control,"
"RSRP" is defined as "Reference Signal Received Power."
"RSRQ" is defined as "Reference Signal Received Quality."
"SI" is defined as "System Information."
"SIB" is defined as "System Information Block."
"SMS" is defined as "Short Message Service"
"TAI" is defined as "tracking area identity."
"UE" is defined as "User Equipment,"
"UMTS" is defined as "Universal Mobile Telecommunications System."

The embodiments are related to the interaction of UEs, macro eNBs, and HeNBs with each other. In particular, the embodiments are related to mobility, or handover, of a UE from a macro eNB to a HeNB. Although, for the sake of ease of reference only, reference is made herein to the terms eNB and HeNB, the present disclosure applies to other types of base station including base station subsystem (BSS), Node B (NB), and Home Node B (HNB). The embodiments contemplate mobility from eNBs, NBs, BSSs, and RNs, (macro network devices) to HeNBs, HNBs, microcells, femtocells, picocells, and like devices (micro network devices). Thus, the embodiments are not limited to only mobility between an eNB to a HeNB, even if the embodiments are illustrated using these terms.

Still more particularly, some of the embodiments are related to measurement and reporting requirements and conditions for a UE with respect to one or more eNBs and/or HeNBs. Currently, several open issues remain to be resolved regarding UE behavior in these cases.

For example, the embodiments address six known issues with respect to inbound mobility or handover to closed subscriber group (CSG) cells and/or hybrid cells when a UE is in RRC_Connected mode, RR Dedicated mode or RR Packet Transfer mode, jointly referred to generically as "connected mode". A CSG cell is a cell that only allows certain UEs to be serviced by that cell. A hybrid cell may service some CSG groups, but also allow other UEs more general access, perhaps on different terms.

A first known issue is that current measurement events may not be adequate for CSG/hybrid cells due to low transmit power of these cells. In addition, when defining new measurement events, the criteria for the measurement reports should be maintained so as to avoid triggering excessive measurement reports and signaling overhead.

A second known issue is that service interruption may occur if autonomous gaps or scheduled gaps may be used for handover evaluation at the UE. Thus, unnecessary handover evaluation should be avoided. Handover evaluation is a term used to refer to the process by which the UE acquires cell global ID (COD and performs preliminary access check of a neighbor cell.

A third known issue is that in a conventional system, a UE reports all cells regardless of whether the UE is allowed to access the cells, subject to measurement reporting criteria. Reporting criteria should be defined for a UE to report signal strength of CSG cells which are not in the allowed CSG list of a U. Currently, if a CSG is not in the UE's allowed CSG list, such CSGs cells undesirably might be ignored.

A fourth known issue is that the UE might not have fingerprint information when a new HeNB is first powered on or is otherwise made available. Thus, the UE may not report the signal strength or handover evaluation information in measurement reports if the signal strength does not meet the criteria otherwise defined for CSG/hybrid cells.

A fifth known issue is that, in dense CSG cell deployments, excessive battery power and/or signaling may be used to measure and report all detected CSG cells, even if thresholds are set. Excessive power and/or signaling should be avoided.

A sixth known issue is that certain categories of CSG cells may not be appropriate targets for handover. Thus, techniques for distinguishing categories of CSG cells are desirable.

The embodiments described herein address these and other issues. Embodiments are provided with respect to addressing each issue, and alternative embodiments are also provided.

FIG. 1 illustrates an embodiment of a RAN 100, which may be a LTE or LTE-A network as described in the 3GPP. FIG. 1 is exemplary and may have other components or arrangements in other embodiments.

In an embodiment, the RAN 100 may comprise one or more access nodes 110 and 140, one or more RNs 120, and one or more UEs 130. FIG. 1 shows a second access node 140 being present. Either access node 110 or 140 may be an eNB, a base station, or other component that promote network access for the UEs 130.

In the embodiments described herein, access node 110 may be a "macro" access node (or macro eNB) and the second access node 140 may be a micro access node, femto access node, or home access node (HeNB). However, in other embodiments this arrangement may be reversed or modified, such as by the inclusion of more or fewer access nodes having similar or different designations.

Generally, HeNBs, CSG cells, microcells, or femtocells are concepts introduced for UMTS and LTE (E-UTRAN) to improve indoor and micro-cell coverage, as well as to leverage wireline backhaul to the 'home' or other private area. These terms may be widely used outside of 3GPP to mean any cell with a very small coverage. As used herein, the terms "HeNB," "microcell," and "femtocell" may be used interchangeably. The term "CSG" refers to a "closed subscriber group," and refers to a cell that only allows certain users to access that cell. The terms HeNB or HNB are used in 3GPP with specific meanings, such as that the cell is a CSG cell or hybrid cell.

The term "macro" cell, while possibly not having significance in 3GPP specifications, may be widely used to mean a cell other than a HeNB cell, microcell, picocell, femtocell, or CSG cell. The embodiments described herein relate to mobility procedures when a UE is being handed over from a macro eNB to a CSG cell or hybrid cell, or relate to when a determination is being made whether to perform such a handover.

Returning to FIG. 1, access node 110 and access node 140 may communicate with any UE 130 which may be within the same cell, though in one particular embodiment preferably only one access node handles communications with a given UE. A cell may be a geographical area of reception and transmission coverage. The access nodes 110 and 140 may communicate with other components or devices to provide components of the RAN 100 access to other networks, for instance using similar or different network protocols or technologies.

RN 120 may be used to enhance coverage within or near a cell, or to extend the size of coverage of a cell. Additionally, the use of a RN 120 can enhance throughput of a signal within a cell because the UE 130 can access the RN 120 at a higher data rate or a lower power transmission than the UE 130 might use when communicating directly with the access node 110 for that cell.

Additional characteristics of eNBs, HeNBs, RNs, UEs, and wireless communications may be found in the 3GPP technical specifications. The embodiments contemplate the meanings and definitions provided in these technical specifications as of the date of filing of this document.

Closed Subscriber Groups (CSGs)

One aspect of HeNB functionality may be the ability to restrict access to particular users. For example, access to a cell might be restricted to employees of the company on whose site the HeNB is deployed, to customers of a particular coffee shop chain, or even to particular individuals within a private residence.

3GPP technical specifications have defined the concept of a Closed Subscriber Group cell. A CSG cell may indicate that it is a CSG cell by means of one bit broadcast in the system information, and a CSG ID also in system information. A cell may only indicate one or none CSG IDs; however, multiple cells may share a CSG D. A UE may be subscribed to multiple CSGs. Such subscriptions may be temporary in nature, such as a coffee shop allowing a customer one hour of access to the coffee shop's CSG.

As used herein, the term "allowed CSG list" refers to a list of CSGs of which the UE is a member. As used herein, the allowed CSG list is from the AS perspective and includes both the NAS UE's allowed CSG list and operator CSG list, as well as potentially other types of CSG list defined for the NAS. As used herein a CSG is "not allowed" if the CSG is not in the allowed CSG list of the UE.

Regarding terminology not specific to CSG mobility, two terms should be described: handover preparation and SI acquisition. In handover preparation, a network-side procedure includes preparing a target cell for handover by a source cell. SI acquisition may be used for reception and decoding of broadcast system information in a cell. SI acquisition may be used to obtain, for example, the handover preparation information on the UE side.

Regarding terminology specific to CSG mobility, six terms are described: preliminary access check, handover evaluation, handover preparation information, SI gap, SI report, and non-SI measurement report. A preliminary access check may be used by a UE to determine whether the UE is allowed to access a cell by checking CSG membership. In other words, the preliminary access check applies only to CSG cells and may be used to determine whether the CSG ID of the cell is in the UE's allowed CSG List. Handover evaluation refers to acquiring a cell global ID and performing a preliminary access check. These processes may be performed at the UE. Handover preparation information refers to E-CGI, CSG ID and TAI sent by a UE in a measurement report. The SI gap refers to a break in transmission or reception with a serving cell in order to allow for system information acquisition of a non-serving cell. The allowed CSG cell of a UE refers to a CSG cell whose CSG ID is in the UE's allowed CSG list. The SI report refers to a measurement report that includes the handover preparation information. The non-SI measurement report refers to a measurement report that is not an SI report.

Legacy Devices

UMTS CSG cells may not be listed in the neighbor cell lists of non-CSG cells. For this reason, legacy UMTS devices, which may be Release-7 or earlier UMTS devices, may not search for CSG cells. Should such a device attempt to access a CSG cell, its registration attempt may be rejected. E-UTRAN is specified first in Release 8, and therefore all E-UT-RAN capable devices may be "CSG-aware" devices, even if they have no CSG subscription.

the Mode Mobility to and from CSG

Generally, network operators may prefer that devices which have a subscription to a CSG cell camp on that cell, in preference to a non-CSG cell. However, the determination by the device to search for CSG cells is implementation-specific, and may be manually triggered. UEs may store some information, such as GPS coordinates, a list of macro cells which are detected, or other information, corresponding to the location of cells which they are able to access. This information may be used to speed up subsequent cell accesses. This process may be referred to as "fingerprinting."

The decision of which target cell to camp on is also dependent on the cell selection and reselection rule defined for UTRAN and E-UTRAN. Currently, in Release-8, a UE may reselect to a cell if it is the best cell of any cells using its particular carrier frequency. The "best" may be considered the cell with the strongest signal strength. While the UE is camped on a suitable CSG cell, the UE may consider the current frequency to be the highest priority frequency. Idle mode reselection away from CSG cells towards a non-CSG cell follows legacy behavior for reselection to such cells.

Connected Mode Mobility to and from CSG Cells

In Release 8, only outbound mobility is supported concerning mobility between macro eNB and HeNB, and between two HeNBs. Outbound mobility may be handover of a UE from a HeNB to a macro eNB. In Release 9, one of the enhancements is to support inbound mobility. Inbound mobility may be handover of a UE from a macro eNB to a HeNB.

Hybrid Cells

Hybrid cells, introduced in Release 9, may be cells that belong to a CSG and have a CSG ID. However, a hybrid cell may allow access to both its CSG members and non-CSG members. For example, a hybrid cell may allow access to UEs who are not subscribed to the CSG that the hybrid cell belongs to. In Release 8, a hybrid cell may be identified by a CSG ID, which it may broadcast, and by setting the CSG indicator bit (E UTRAN) or CSG Indication bit (UMTS) to a value that corresponds to a non-CSG These bits may be transmitted by broadcast signaling.

"PCIIPSC Split"

In E-UTRAN, neighbor cell lists may not be explicit. In other words, neighbor cell lists may not positively identify neighbor cells. Instead, neighbor cell lists may simply indicate a frequency and, optionally, a list of "Not Allowed" or "blacklisted" cells that UEs should not attempt to access, UEs are expected to detect cells on a frequency by blind searching. However, blind searching may lead to a significant problem in the case where many of the detected cells are CSG cells, in order to minimize unnecessary processing of such cells by devices which have no CSG subscription, the network may optionally indicate the "PCI split" applicable to CSG cells. The PCI split may be the set of physical cell identities that are reserved for CSG cells. The PSC split is the analogous indication for UMTS cells, in the case where an operator does list CSG cells in the neighbor cell list.

In an embodiment, a PCI/PSC split may be used to distinguish between hybrid and non-hybrid cells. The PCI/PSC split between hybrid and non-hybrid cells may not be required for connected mode inbound mobility. For idle mode camping, the PCI/PSC split between hybrid and non-hybrid cells may also not be required for intra-frequency cell reselection and cell reselection at higher priority frequencies since a UE may read SIB1 to decide if the UE can camp on the best ranked cell. Fingerprint information and manual search can be used for cell reselection at equal or lower priority frequencies.

Measurement Object and Measurement identity

In UTRAN and E-UTRAN, measurement objects and measurement identities may be configured by the eNB for a UE to trigger measurement reporting from the UE. The UE measures one or more properties of a connection and if measurement reporting is triggered, reports these one or more properties to a network component.

A measurement object may be associated with a particular carrier frequency, which may be the same frequency as the serving cell or a different frequency for the case of inter-frequency measurement. The eNB may configure one or more measurement objects for a UE.

To trigger measurement reporting from a UE, the eNB may configure one or more measurement identities for a UE. Each measurement identity is associated with a measurement object and a reporting configuration. A reporting configuration defines the criteria, such as for example RSRP/RSRQ thresholds, upon which the measurement reporting from the UE is triggered.

Mobility Towards CSG/Hybrid Cells

A UE which is subscribed to the CSG ID of a given CSG cell may prioritize its camping towards the CSG Cells when in coverage of the CSG cells. The UE may set the reselection parameters accordingly or other means should allow the UE to prioritize its camping.

For inbound mobility to CSG cells in idle mode, intra-frequency cell reselection shah be completed as for normal reselection to non-CSG cells. In the case of inter-frequency mobility, it is desirable that inbound cell reselection is possible within 20-60 s.

Regarding functional and/or performance requirements, the handover procedures may take into account whether a UE is subscribed to the CSG ID of the target CSG Cell. The mobility procedures may allow for prioritization of the CSG Cells in ECM-CONNECTED when the UE enters coverage of a CSG Cell to which it is subscribed.

It may be possible to minimize the quantity of measurements which a UE performs on CSG Cells which it is not permitted to access. The PCI of a HeNB might change at each power up of the HeNB. Although a change of PCI is expected to be infrequent, if it changes, mobility may still be supported without user intervention.

For handover to CSG cells, the cell search, CSG identification, and handover process may be completed in the order of one second in case of intra-frequency mobility. In case of inter-frequency mobility, 10-30 seconds is expected, including the autonomous CSG search time.

Regarding measurements and handover preparation, the UE may perform measurement reporting of ail cells as in Release 8. This reporting may include PCI/PSC plus signal strength/quality. Measurement reporting may be performed regardless of whether the UE is allowed to access the cell, subject to measurement configuration. The UE may not know whether it is allowed to access a particular cell.

The UE may request configuration of inter-frequency measurements, if needed, depending on UE capabilities. This request may be made when the UE determines that it may be in the vicinity of an accessible inter-frequency CSG cell. This request may be made by implementation-specific means, such as fingerprinting. The determination of being within the vicinity of an accessible inter-frequency CSG cell may be made by sending a proximity indication to the network.

In order to assist the serving cell with handover preparation, the UE may acquire, by means of SI gaps, handover preparation information. This information may be acquired in addition to the Release 8 measurement reporting information. The UE may use Release 9 measurement reporting procedures to produce a measurement report that includes handover preparation information.

In case a preliminary access check is required or desired, the UE may perform a preliminary access check of detected CSG cells, under the control of the network. The network typically only initiates handover preparation to CSG cells for which the UE has performed a preliminary access check.

The UE may include the handover preparation information of a CSG Cell/Hybrid Cell in a Release 9 measurement report containing the PCI of this cell without an explicit request from the network, if the UE has been able to determine the handover preparation information. UEs may receive an indication that inbound connected mode mobility, such as a handover, to CSG cells and Hybrid cells is not supported. If the UE receives such an indication, the UE should not send a proximity indication or a measurement report that includes handover preparation information.

Several issues remain unresolved as of the date of filing of this document. For example, with respect to mobility towards CSG/hybrid cells, it is unknown whether SI gaps are to be i) scheduled by the network, ii) autonomously scheduled by the UE using one or more sub-frames of its choice (on the order of the network), or both. If autonomous gaps are to be used and no order to acquire SI is received, UE might follow DRX requirements as specified in Release 8.

In addition to the above, there are a number of open issues related to hybrid cells that have yet to be addressed. Regarding unnecessary UE reselections & registrations to hybrid/open cells, the high density of hybrid cells may cause this problem due to more frequent cell re-selection at the UE, resulting in high battery power consumption, and similar issues. Different criteria may be needed to perform cell re-selection for the case of hybrid cells.

Another unresolved issue is the procedure involved when an open hybrid cell becomes closed (i.e. becomes a CSG cell). For example, relocation for the camped non-member UEs might be immediate or might be gradual in case of active service where a handover is triggered. Another unresolved issue is how a hybrid cell indicates to a UE that it has become a CSG cell. A related unresolved issue is how long after the indication occurs do non-member UEs have to leave the CSG cell.

Macro cell and CSG/hybrid cells might offer different services. However, currently it is not clear if a non-member of a hybrid cell will receive the special service offering from a hybrid cell, and therefore whether there is reason for a non-member UE to camp on a hybrid cell if the hybrid cell does not have the strongest signal strength.

Other issues remain unresolved. For example, it is yet to be determined how a UE who is a member of a hybrid cell prioritized over a UE who is not a member of the hybrid cell.

Overview of Issues Addressed by the Several Embodiments Described Herein

The embodiments described herein address several open issues of inbound mobility or handover to CSG/hybrid cells when a UE is in connected mode. In one embodiment, for both autonomous gaps and scheduled gaps for handover evaluation, the eNB may order the UE to perform handover evaluation and report handover preparation information. In order for the eNB to perform this function, some triggers may be specified. For example, the UE may report the signal strength of neighbor cells. Existing Rel-8 measurement events may not be adequate for triggering a measurement report of CSG/hybrid cells due to the low transmit power level of CSG/hybrid cells. In addition, when defining new measurement report triggering events for CSG/hybrid cells, the criteria for measurement reports may be such that the criteria do not trigger an excessive amount of measurement reports. For example, a UE with high mobility may move through multiple CSG cells within a short time; thus, by the time the measurement report has reached the eNB and handover preparation has taken place at the eNB, the UE may have moved away from a particular CSG cell and measurements are therefore stale.

In another embodiment, either autonomous gaps or scheduled gaps may be used for handover evaluation at the UE. For example, either kind of gap may be used to acquire the SI of neighbor CSG/hybrid cells. For both cases, if the gaps are not located within the natural DRX duration of the UE, service interruption may occur. Unnecessary handover evaluation of a neighbor cell should be avoided.

In another embodiment, when the UE reports signal strength of neighbor cells in the measurement report, the UE may indicate which cell is potentially an allowed CSG cell so that the eNB can order the UE to perform handover evaluation of certain cells. However, to avoid excessive handover evaluation of many neighbor cells, some prioritization of different CSG/hybrid cells may be required or desired.

In another embodiment, some measurement reporting criteria may be defined for the UE to report signal strength of CSG cells which are not in the allowed CSG list of the UE. The UE may perform measurement reporting of all cells as in Release 8 regardless of whether the UE is allowed to access the cell, subject to measurement configuration.

In still another embodiment, when a new HeNB is first deployed or powered on, the UE may not have fingerprint information related to the HeNB. Therefore, the UE may be required not to report the signal strength or handover evaluation information in measurement reports, if the signal strength does not meet the criteria defined else wise for CSG/hybrid cells. In dense CSG cell deployments, the UE may use excessive battery power and/or signaling to measure and report on all detected CSG cells, even if there are thresholds set by the network to limit these.

Certain categories of CSG cells may not be appropriate targets for handover, depending on their deployment and the mobility or current serving cell of the device. For example, cells aboard a moving vehicle may not be used by stationary users near to the vehicle. In another example, handover between cells set up to provide track-side coverage for trains or highway coverage may be optimized for high-mobility devices. Therefore devices on the train should preferably consider these cells as handover candidates, rather than private CSG cells where handover may not be configured. The eNB may have the final determination on hangovers.

FIGS. 2A and 2B together are a flowchart illustrating steps involved in signal strength measurement, handover evaluation, and reporting, in accordance with an embodiment of the disclosure. The process illustrated in FIGS. 2A and 2B may be implemented in one or more network components such as access nodes 110 and 140, RN 120, and/or UEs 130. The process illustrated in FIGS. 2A and 2B may be implemented by one or more devices, such as the device shown in system 715 of FIG. 7. The process shown in FIGS. 2A and 26 is exemplary only, and not limiting of the embodiments described herein.

The process begins as the UE performs one or more measurements of a neighbor cell or cells for example due to serving cell strength being below a certain threshold, or due to fingerprinting information of CSG/hybrid cells (block 200). Optionally, if DRX opportunities are available, the UE obtains handover preparation information of certain neighbor cells based on fingerprinting information and signal strength measured in the step shown in block 200 (block 202). The measurement report may be sent by the UE for cell "X" based on e.g. configured measurement reporting trigger criteria, i.e., measurement identities and reporting configuration (block 204). Block 204 may be related to the discussion of signal strength measurement control, reporting of not-allowed CSG cells, and macro eNB triggered measurement, as described below.

A determination is then made whether handover preparation information of cell "X" has been previously acquired or stored prior to the measurement report being sent (block 206). An example of previously acquired or stored handover preparation information might be fingerprinting information for a cello if the handover preparation information of cell "X" has been previously acquired or stored (a "yes" determination to block 206), then the UE sends a SI report including indication of whether the handover preparation information was obtained within a predefined validity period, or the elapsed time since the SI was obtained (block 208). If not (a "no" determination to block 208), then the UE sends the measurement report without a SI report or the time at which the SI was obtained (block 210). Blocks 208 and 210 may be related to the discussion of measurement reports and prioritization of neighbor CSG/hybrid cells, below.

Regardless of the outcome of decision block 206, a determination is made whether the eNB decides to order the UE to acquire handover preparation information of cell "X" (block 212). This decision may be based on factors such as signal strength and/or the elapsed time of the reported handover preparation information in a previous measurement report. If the eNB decides to order the UE to acquire handover preparation information of cell "X" (a "yes" determination to block 212), then the eNB orders UE to acquire handover preparation information of certain cells and indicate the measurement reporting trigger criteria, i.e., the measurement identities, and reporting configuration, upon which the SI report should be triggered; and additionally the UE acquires handover preparation information if the SI report is triggered (block 214). Subsequently, the UE sends the SI report (measurement report including handover preparation information: CGI and TAI, CSG ID, result of preliminary access check, and/or others) and may indicate whether the SI was obtained within a predefined validity period; or the elapsed time of when the SI was obtained (block 216).

Blocks 212 and 214 may be related to the discussion of handover evaluation using autonomous gaps and scheduled gaps, described below. Additionally, block 216 may be related to the discussion of measurement reports and prioritization of neighbor CSG/hybrid cells, described below.

After block 216, or in response to a "no" determination at decision block 212, the eNB decides if handover is required, and the target cell if handover is required (block 218). The process of signal strength measurement, handover evaluation and measurement reporting terminates thereafter.

Within certain of the steps described above, additional steps and/or embodiments are provided herein. For example, additional steps and embodiments are provided below with respect to blocks 204 and 208 through 216.

Signal Strength Measurement Control

Attention is now turned to embodiments relating to signal strength measurement control. These embodiments may be related to block 204 of FIG. 2A. Because CSG/hybrid cells may have different transmit power than macro cells, the criteria (Including parameter values) used to trigger measurement reporting may be different. In addition, since the coverage area of a CSG/hybrid cell is typically much smaller than that of a macro cell, a high mobility state UE may move across multiple CSG/hybrid cells within a short duration. For a high mobility state UE, it may be more desirable for the UE to perform handover to a macro network in order to prevent service interruption to the UE as well as increased signaling overhead and burden for both over-the air as well as backhaul communications caused by too frequent handovers between CGS/hybrid cells, In some scenarios, where CSG/hybrid cells provide services in the coverage holes of macro cells, a high mobility state UE might be required to perform fast handover to the target CSG/hybrid cell. In the case where a UE is located in a train, the train track where a train would pass is likely predictable, so the UE's mobility and target CSG/hybrid cell are predictable on the train track. The appropriate filter coefficient value may be configured for the UE when applying the measured signal strength to the defined measurement reporting thresholds, such that the desired handover frequency can be controlled.

Regarding signal strength measurement control, there are at least five embodiments. In a first embodiment, the eNB may configure different measurement reporting criteria for different types of cells, including macro cells, CSG cells, hybrid cells and different types of CSG/hybrid cells, e.g. CSG/hybrid cells in a campus, CSG/hybrid cells in a high mobility environment (e.g. along the highway, train track), etc. The different measurement reporting criteria includes values of various RSRP/RSRQ thresholds, RSRP/RSRQ measurement filter coefficient values, cell type, CSG Type, or some other parameters which indicate the level of UE mobility (e.g. low, medium or high) to which the measurement reporting criteria apply. A UE may be configured with multiple measurement identities, where each corresponds to macro cells or CSG/hybrid cells or a specific CSG/hybrid cell type with the associated measurement reporting criteria. A UE may determine if a cell is a macro cell, CSG cell, or hybrid cell or certain CSG/hybrid cell type based on the PCI of the cell and/or the UE's implementation, e.g. stored fingerprinting information, previous preliminary access check information, and others. The UE may then apply the appropriate measurement reporting criteria.

In a second embodiment, since a UE may have an empty allowed CSG list and the UE may not be able to detect a macro versus CSG/hybrid cell, the UE may inform the serving eNB of its CSG support capability during capability exchange signaling (e.g. when the UE enters the connected mode). In one implementation, the capability information that the UE provides to the eNB includes the UE's capability to detect CSG cells, and whether the UE has a non-empty allowed CSG list. In this way, the serving eNB can configure the appropriate measurement reporting criteria for the UE. A UE that does not support access to a CSG cell but can detect a CSG and/or hybrid cell can still be configured with measurement reporting criteria that corresponds to CSG and/or hybrid cells. On the other hand, for a UE that does not support access to CSG cell and cannot detect a CSG and/or hybrid cell, the UE might not be configured with measurement reporting criteria that correspond to CSG or hybrid cells.

In a third embodiment, CSGs and/or CSG cells may be categorized into different CSG types according to the deployment environment of the CSG cell(s). For example, a CSG type of 'campus' may be defined for CSG cells belonging to a particular CSG; a CSG type of 'train' may be defined for CSG cells that serve along the train track; other CSG types may defined as desired. A UE may be configured to take into account the CSG type of the serving cell (if it is a CSG cell) and/or the CSG type of a neighbor cell when performing and reporting measurements. For example, when a UE is in a certain area which may be indicated by a CSG Type of the serving cell, the UE may check the CSG ID of a neighbor cell and verify if this CSG D is provisioned as a certain CSG type in the UE's CSG list. For example, a CSG Type may be "train" and/or be based on fingerprinting information. In other words, the UE may store a list of CSGs or CSG cells and their associated type. If a neighbor cell's CSG ID is associated with a certain CSG type in the UE's CSG list, then the UE may be triggered to send a measurement report for that cell.

In a fourth embodiment. CSG types could, for example, be indicative of the capabilities or services provided by a CSG cell. In a more particular example, CSG cells of a particular type may not support incoming handover at all. Hence, in this case, there is no point in a device acquiring the system information of such a cell as part of a handover evaluation procedure. Some CSG types may support packet switched (PS) Handover only, or circuit switched (CS) or voice handover only, or both (but only one procedure at a time), or both (possibly in parallel, so as to maintain continuity of both CS and PS services). Some CSG types may support voice over PS domain, which may be applicable for IMS services. Some CSG types may support emergency call functionality, either supported by VoIMS, PS, or CS services.

In a fifth embodiment, the eNB can further configure a UE to send a measurement report of a cell only if the signal strength criteria are met, or if the CSG ID of the cell belongs to the UE's allowed CSG list and/or the UE's preferred CSG list. This embodiment may avoid excessive measurement reporting from the UE.

In Release 8, the UE might only include the list of cells in the measurement report based on the top "N" best/strongest cells. In a sixth embodiment, the eNB may configure a UE to determine whether to include the list of cells in the measurement report based on the top "N" best/strongest cells. Alternatively, the determination may be based on UE specific priority levels of the cells, such as preference levels, or a combination of these factors. In one implementation, a UE can only include a CSG/hybrid cell in the measurement report if the received signal strength (e.g. RSRP, RSRQ) is higher than a threshold configured by the eNB. Further, the eNB can also configure the UE to report the best "N" macro cells and the best "M" CSG/hybrid cells. In another implementation, the eNB can also configure the UE to report the best "N" macro cells and the best "M" allowed CSG cells or hybrid cells whose CSG Ds are in the UE's allowed CSG list. In this way, the UE could report a mixture of the best macro cells, and/or best CSG/hybrid cells, and/or prioritized CSG/hybrid cells. In this embodiment, the UE may have the flexibility to report, under various criteria, the number of the strongest/best CSG/hybrid cells. This report may be driven by either the UE or the eNB.

The embodiments described below relate to specific embodiments of those embodiments described above. In one embodiment, measurement reporting events can be specified for CSG/hybrid cells. Measurement reporting events may be similar to those defined in LTE Release 8, such as events A1, A2, A3, A4, and A5. The eNB may create one or more measurement identities, "measId," to associate a measurement object with the reporting configuration, which includes specific measurement reporting event, that corresponds to the CSG/hybrid cells. An indication may be added in the reporting configuration to indicate that the reporting configuration should be used for triggering measurement reporting of macro cells or CSG/hybrid cells. In one specific embodiment, for E-UTRA, the indication of CSC/hybrid cell specific reporting configuration may be added in the ReportConfigEUTRA (IE) sent in the RRCConnectionReconfiguration message from the eNB to the UE. This is shown in the exemplary ReportConfigEUTRA information element, below in table 1, as "csgHybridIndicator."

The UE may be able to determine that a cell is a CSG cell based on the detected PCI without the need to read the SIB1 if the PCI split is known. For hybrid cells, the UE can use its stored fingerprinting information to estimate that a cell is a hybrid cell, or use information obtained from a prior preliminary access check of the neighbor cell. The UE then may use the corresponding measurement identity and reporting configuration based on whether a cell is a macro or CSG/hybrid cell. A UE may use the measurement identities corresponding to a macro cell if the UE cannot determine if a cell is a CSG or hybrid cell.

The criteria for existing measurement reporting events may be modified to incorporate CSG-specific parameters. For example, another parameter "csgCellOffset" may be added to the ReportConfigEUTRA IE to provide the neighbor cell-specific offset for events A3, A4 and A5, as well as new events A6 to A11 described below for CSG/hybrid cell reporting. In one embodiment, the inclusion of the "csgCellOffset" may be used as an implicit indication that this reporting configuration should be applied for a CSG/hybrid cell.

In one embodiment, additional measurement reporting events can be defined for CSG/hybrid cells to factor in whether a CSG/hybrid cell is in the UE's allowed CSG list and/or if a CSG/hybrid cell belongs to the UE's preferred CSG. One or multiple CS sin the allowed CSG list of the UE may be the UE's preferred CSG(s). In this way, the eNB can limit the measurement reporting of a UE to only CSG cells that belong to a UE's allowed CSG list and/or UE's preferred CSG.

On the other hand, as described earlier, the eNB can also use the Release 8 measurement events to allow the UE to report neighbor cells, regardless of their type, for the purpose of interference assessment. In general, the existing Release 8 measurement events would be more restrictive than those specifically for CSG cells. For example, the signal strength/quality threshold for the target cell would be configured to be higher for these events than for events applicable only to CSG cells.

The new measurement events may be defined to include these CSG-related criteria, derived from the Release 8 measurement events A3, A4, A5, as shown below:

Event A6: extension of event A3, that is, neighbor cell becomes offset better than serving cell and neighbor cell is in the UE's allowed CSG list.

Event A7: extension of event A3, that is, neighbor cell becomes offset better than serving cell and neighbor cell is in the UE's allowed CSG list and belongs to the UE's preferred CSG.

Event A8: extension of event A4, that is, neighbor cell becomes better than threshold and neighbor cell is in the UE's allowed CSG list.

Event A9: extension of event A4, that is, neighbor cell becomes better than threshold and neighbor cell is in the UE's allowed CSG list and belongs to the UE's preferred CSG.

Event A10; extension of event A5, that is, serving cell becomes worse than threshold1 and neighbor cell becomes better than threshold2 and neighbor cell is in the UE's allowed CSG list.

Event A11: extension of event A5, that is, serving cell becomes worse than threshold) and neighbor cell becomes better than threshold2 and neighbor cell is in the UE's allowed CSG list and belongs to the UE's preferred CSG.

Event A12: extension of event A4, that is, neighbor cell becomes better than threshold and neighbor cell CSG Type corresponds to a specific CSG type (e.g. "train") specified for this event.

The new events A6, A7, A8, A9, A10, A11, and A12 may be added to the ReportConfigEUTRA information element as shown in table 1 below in the exemplary information element. The UE may use stored fingerprinting information or a preliminary access check during handover evaluation to determine if a cell belongs to the UE's allowed CSG list, if a cell belongs to the UE's preferred CSG, and/or if a CSG cell belongs to a specific area which is associated with a CSG Type.

In Release 8, the UE only includes in the measurement report sent to the eNB the best or strongest maxReportCells cells that meet the measurement reporting criteria. In one embodiment of this disclosure, the eNB may instruct a UE to prioritize the cells to be included in the measurement report based on preferred CSG membership. As shown in the exemplary IE below in table 1, a flag, prioritizedReporting may be added to indicate to the UE whether to perform prioritized reporting. If prioritized reporting is indicated, the UE can report neighbor CSG//hybrid cells that are not necessarily the best or strongest cells. In one embodiment, a UE can be configured to prioritize sending the measurement report for certain CSG cells in the CSG list provisioned when a UE is located in certain area, as indicated by the CSG Type (e.g. CSG Type='train'). In another embodiment, three fields: maxReponCellsMacro, maxReportCellsCSGHybrid, and maxReportCellsCSGHybridPreferred may be introduced, as shown in the exemplary IE below in Table 1, to specify the best maxReportCellsMacro macro cells, the best maxReport-CelisCSGHybrid CSG/hybrid cells, and/or the best maxReportCellsCSGHybridPreferred CSG or hybrid cells whose CSG IDs are in the UE's allowed CSG list, the UE should report.

Exemplary ReportConfigEUTRA Information Element

TABLE 1

```
ASN1START
ReportConfigEUTRA ::=SEQUENCE {
    triggerType         CHOICE {
        event               SEQUENCE {
            eventId             CHOICE {
                eventA1             SEQUENCE {
                    a1-Threshold        ThresholdEUTRA
                },
                eventA2             SEQUENCE {
                    a2-Threshold        ThresholdEUTRA
                },
                eventA3             SEQUENCE {
                    a3-Offset           INTEGER (–30 . . . 30),
                    reportOnLeave       BOOLEAN
                },
```

TABLE 1-continued

```
            eventA4              SEQUENCE {
                a4-Threshold     ThresholdEUTRA
            },
            eventA5              SEQUENCE {
                a5-Threshold1    ThresholdEUTRA,
                a5-Threshold2    ThresholdEUTRA
            },
            eventA6              SEQUENCE {
                a6-Offset        INTEGER (-30 . . . 30),
                reportOnLeave    BOOLEAN
            },
            eventA7              SEQUENCE {
                a7-Offset        INTEGER (-30 . . . 30),
                reportOnLeave    BOOLEAN
            },
            eventA8              SEQUENCE {
                a8-Threshold     ThresholdEUTRA
            },
            eventA9              SEQUENCE {
                a9-Threshold     ThresholdEUTRA
            },
            eventA10             SEQUENCE {
                a10-Threshold1   ThresholdEUTRA,
                a10-Threshold2   ThresholdEUTRA
            },
            eventA11             SEQUENCE {
                a11-Threshold1   ThresholdEUTRA,
                a11-Threshold2   ThresholdEUTRA
            },
            eventA12             SEQUENCE {
                a12-CsgType      ENUMERATED       {Train,
Plane, Bus},
                a12-Threshold    ThresholdEUTRA
            },
. . .
        },
        hysteresis               Hysteresis,
        timeToTrigger            TimeToTrigger
    },
    periodical           SEQUENCE {
        purpose                  ENUMERATED {
                                 reportStrongestCells, reportCGI}
    }
    },
    triggerQuantity    ENUMERATED {rsrp, rsrq},
    reportQuantity     ENUMERATED {sameAsTriggerQuantity, both},
    maxReportCells     INTEGER (1 . . . maxCellReport),
    reportInterval ReportInterval,
    reportAmount       ENUMERATED {r1, r2, r4, r8, r16, r32, r64, infinity},
    csgHybridIndicator BOOLEAN (or BIT STRING (SIZE (2)))            OPTIONAL,
    csgCellOffset      Q-OffsetRange       OPTIONAL,
    prioritizedReport          BOOLEAN               OPTIONAL,
    maxReportCellsMacro        INTEGER (1 . . . maxCellReportMacro)        OPTIONAL,
    maxReportCellCSGHybrid     INTEGER (1 . . . maxCellReportCSGHybrid)    OPTIONAL,
    maxReportCellCSGHybridPreferred      INTEGER(1 . . . maxCellReportCSGHybrid)
    OPTIONAL,
    . . .
}
ThresholdEUTRA ::=                       CHOICE{
    threshold-RSRP                       RSRP-Range,
    threshold-RSRQ                       RSRQ-Range
}
ASN1STOP
```

An example of a CSG/hybrid cell specific reporting configuration is provided in the following Table 2:

TABLE 2

| ReportConfigEUTRA field descriptions |
| --- |
| eventId |
| Choice of E-UTRA event triggered reporting criteria. |
| aN-ThresholdM |

TABLE 2-continued

ReportConfigEUTRA field descriptions

Threshold to be used in EUTRA measurement report triggering condition for event number aN. If multiple thresholds are defined for event number N, the thresholds are differentiated by M.
a3-Offset Offset value to be used in EUTRA measurement report triggering condition for event a3. The actual value is IE value * 0.5 dB.
reportOnLeave Indicates whether or not the UE shall initiate the measurement reporting procedure when the leaving condition is met for a cell in cellsTriggeredList, as specified in 5.5.4.1.
triggerQuantity The quantities used to evaluate the triggering condition for the event. The values rsrp and rsrq correspond to Reference Signal Received Power (RSRP) and Reference Signal Received Quality (RSRQ), see TS 36.214 [48].
timeToTrigger Time during which specific criteria for the event needs to be met in order to trigger a measurement report.
reportQuantity The quantities to be included in the measurement report. The value both means that both the rsrp and rsrq quantities are to be included in the measurement report.
maxReportCells Max number of cells, excluding the serving cell, to include in the measurement report.
reportAmount Number of measurement reports applicable for triggerType 'event' as well as for triggerType 'periodical'. In case purpose is set to 'reportCGI' only value 1 applies.
ThresholdEUTRA For RSRP: RSRP based threshold for event evaluation.
For RSRQ: RSRQ based threshold for event evaluation.
csgHybridIndicator Set to 'True' to indicate that the reporting configuration should be used for CSG/hybrid cells. Set to 'False' to indicate the the reporting configuration should be used for macro cells.
Alternatively, this is a two-bit field to indicate the following:
00: to indicate that the reporting configuration should be used for any CSG/hybrid cell
01: to indicate that the reporting configuration should be used for allowed CSG cell or hybrid cell whose CSG ID is in the UE's allowed CSG list
10: to indicate that the reporting configuration should be used for preferred CSG cell or preferred hybrid cell
11: to indicate that the reporting configuration should be used for macro cell
csgCellOffset CSG cell offset applicable to a specific neighboring CSG cell. Value dB-24 corresponds to −24 dB, dB-22 corresponds to −22 dB and so on. This field is only included if csgHybridIndicator is set to 'True'.
prioritizedReporting Set to 'True' to indicate that prioritized reporting should be used.
a12-CsgType This is the CSG Type associated with a CSG identity in the UE's allowed CSG Lists and this CSG Type can be configured by operator or enterprise. Example of CSG Type includes train, office, campus, etc.. The CSG type allows the UE to be configured to perform measurement reporting when the UE is in certain environment as specified by a12-CsgType.
maxReportCellsMacro Max number of macro cells, excluding the serving cell, to include in the measurement report.
maxReportCellsCSGHybrid Max number of CSG or hybrid cells, excluding the serving cell, to include in the measurement report
maxReportCellsCSGHybridPreferred Max number of CSG or hybrid cells whose CSG IDs are in the UE's allowed CSG list, excluding the serving cell, to include in the measurement report.

Additional Detail on CSG Types

Categorizing CSG cells into 'types' would resolve issues related to dense CSG cell deployments and certain categories of CSG cells that may not be appropriate targets for handover. These two issues are described above. One option is for a CSG ID to be associated with a 'CSG type'. Another option, that would remove the need to use a cell's CSG ID to determine its type, is for CSG cells to select their PCI according to their type. Currently, the concept of a PCI split exists to distinguish CSG from non-CSG cells; however, in the embodiments described herein, further distinction is proposed.

Returning to the problem of different mobility scenarios, a CSG type might exist for highway-side or track-side cells, where handover between these cells is configured and/or optimized. In this case, a device currently being served by a particular CSG type will, in general, measure and report cells of the same type with higher priority than other cells. However, a device may also make use of knowledge about its location and/or mobility to prioritize these cells. For example, a UE which is currently served by a "low mobility" cell but finds itself reselecting cells frequently might be an indication of high mobility. Thus, the UE may start to prioritize "high mobility" type CSG cells.

In an embodiment, the device may be configured to be aware of the various types of CSG cells and the means to identify them, such as appropriate PCI value ranges, for example. This information may be broadcast in system information in cells, or may be transferred to devices during provisioning, or may be updated by means of SMS transfer, OMA DM, OMA CP, or other proprietary device management and provisioning protocols over the air.

Preferably, if PCI values are associated with types, a type may have a contiguous range of PCI values associated with ft. Alternatively, the values may be otherwise "close" according to some measurement of closeness, such as according to a code distance. Devices which may not know the exact range of PCI values for each type will generally prioritize cells with a PCI close to that of the serving cell, rather than PCI values further away.

Where CSG type indicates some functionality of the cell, this indication may also be taken into account when measuring, reporting and/or performing handover evaluations of cells. A device may be permitted to decline to perform a requested/ordered handover evaluation for a cell if the device is aware that the type of cell is not suitable. A type of cell might not be suitable if the cell does not support handover, is not optimized for high mobility where the device is currently in a high-mobility scenario, or has some other undesirable property. The device may indicate its reasons for declining the requested/ordered handover evaluation for a cell in the enhanced measurement report.

As described further below, the network may be able to require a device to perform handover evaluation/SI acquisition for a cell, even if the device has not reported a measurement report for that cell. If the indicated cell is not of a type that the device would prioritize, or would not report at all, there are three different possibilities.

In a first possibility, it is specified that the device shah in any case obey the order of the network. The first possibility is called for when the network may be requesting the information for reasons other than specifically related to mobility support of that device. In a second possibility, it is specified that the device need not respond if the cell is not of a type preferred by or appropriate for the device. A third possibility is that an additional indicator is added to the order by the network to indicate that the device may take account of the type of the cell, to the extent the device can determine the type, when determining whether to act on the order.

Embodiments Relating to SI Acquisition or Handover Evaluation Control

The embodiments described below may be related to blocks 212 and 214 of FIG. 2. As described above, for a handover to succeed it might be necessary for the UE to have acquired the handover preparation information. Therefore, unless the UE has already acquired such information, the eNB might need to order the UE to perform handover evaluation by means of either autonomous or scheduled SI gaps.

To minimize the amount of time the UE spends on handover evaluation and in order to reduce the service interruption in the serving cell, the serving eNB can order the UE to perform handover evaluation on one or more specific neighbor cells. The eNB may determine if a neighbor cell is a CSG cell based on the PCI value included in the measurement report previously sent from the UE and based on the information regarding the PCI spilt.

The eNB can make the decision to order handover evaluation based on factors such as signal strength of a neighbor cell previously reported by the UE, whether the eNB has stored CSG cell related information of a neighbor cell that maps to the identified pa, a possibility of UE handover to the neighbor due to loading condition, and other factors. In one implementation, an eNB may store the CSG cell related information of a neighbor cell that was provided by a previous report from a UE served by the eNB. Alternatively, the MME may provide an eNB with up to date CSG cell related information of neighbor CSG cells.

The eNB can also make a decision based on inferring from measurement reports provided by the UE and the measurement reporting configuration applicable to the UE whether a neighbor CSG cell is the UE's preferred or allowed CSG, or whether a neighbor CSG cell is in a certain area that corresponds to a CSG type. CSG types are described above.

The eNB can also instruct a UE to perform handover evaluation of a neighbor cell which is not previously indicated as in the UE's allowed CSG list. This status may be inferred from the measurement report previously provided by the UE, which may have included an indication from the UE whether the reported cell is likely in the UE's allowed CSG list. The eNB can also instruct a UE to perform handover evaluation of a neighbor cell which is a hybrid cell, for the purpose of an interference/neighbor cell survey.

In the handover evaluation order, the eNB may indicate to the UE whether to report the handover preparation information if, after a preliminary access check during handover evaluation, the UE finds out that the CSG cell is not in the UE's allowed CSG list. The eNB may also instruct a UE to perform a handover evaluation on a neighbor CSG/hybrid cell without a prior signal strength report from the UE on this cell. This instruction may be applicable to both hybrid cell and not-allowed CSG cell of the UE. For a not-allowed CSG cell, as part of neighbor CSG cell survey and interference assessment, the eNB may still request a UE to perform a handover evaluation and report the CGI and CSG ID of a neighbor CSG cell. In this manner, the eNB can update its stored neighbor CSG cell information.

The order from the eNB to the UE to perform handover evaluation on specific neighbor cells may include a set of measurement reporting trigger criteria which the UE shall use to decide whether to report the handover preparation information. When the measurement reporting trigger criteria are not met, the UE does not send the measurement report with the handover preparation information. When the measurement reporting trigger criteria are met, the UE sends the handover preparation information. The number of cells for which the UE reports the handover preparation information may be constrained by the maximum number of reported cells configured by the eNB. In one embodiment, the eNB configures the UE to report handover preparation information of the best (or strongest) "N" allowed CSG cells or hybrid cells whose CSG ID is in the UE's allowed CSG list. In another embodiment, the eNB configures the UE to report handover preparation information of the best (or strongest) "N" CSG or hybrid cells regardless of whether the CSG/hybrid cells are in the UE's allowed CSG list.

Other, more specific, embodiments of the above embodiments are described below. Specifically, other embodiments of the above solutions are described with respect to autonomous gaps and scheduled gaps, respectively. These embodiments may be related to blocks 212 and 214 of FIG. 2.

Attention is now turned to embodiments regarding the above solutions with respect to autonomous gaps. If autonomous gaps are used for handover evaluation, in one implementation, the order for handover evaluation sent from the eNB to the UE can be included in the RRCConnectionReconfiguration message, as shown in the exemplary RRCConnectionReconfiguration below in table 3 and table 4. A new IE, RRCConnectionReconfiguration-r9-IEs, may be added, which is similar to the RRCConnectionReconfiguration-r8-IEs, except that a new IE is added to the RRCConnectionReconfiguration-r9-IEs. For example, a HoEvalConfig is added to configure the UE to perform handover evaluation and reporting of some or all of the acquired SI on specific neighbor cells.

There are three possible alternatives for how the eNB indicates the neighbor cells on which the UE should perform handover evaluation in HoEvalConfig IE. The first alternative is shown in with respect to the exemplary HoEvalConfig IE provided below in tables 4 and 5. The PCI of each neighbor cell may be included in the HoEvalConfig IE.

In a second alternative, as shown in the exemplary HoEvalConfig field descriptions below in tables 6 and 7, the eNB may signal the neighbor cells for which the UE should perform handover evaluation and reporting. This signal may be implemented using a bitmap in the HoEvalConfig IE. Each bit in the bitmap corresponds to a neighbor cell included in a previous measurement report from the UE identified by MeasReportId. The MeasReportId field may be included in the HoEvalConfig IE and the MeasResults IE, as shown in the exemplary MeasResults information element. This field may be included to associate the bit string in the bitmap of the HoEvalConfig IE with the neighbor cells previously reported by the UE in the MeasResults IE.

In a third alternative, as shown in the exemplary HoEvalConfig field descriptions below in tables 8 and 9, the eNB may indicate to the UE to perform handover evaluation and reporting of the best or first N cells captured in the previous measurement report from the UE, as identified by MeasReportId. The MeasReportId field may be included in the HoEvalConfig IE.

For the three alternatives described above, the MeasId is included to indicate measurement identity and the corresponding measurement reporting trigger that the UE should use to determine if it should perform handover evaluation and reporting of a neighbor cell included in the HoEvalConfig IE. In one embodiment, the same measurement identity can be used for both signal strength measurement and reporting as well as handover evaluation and reporting. In another embodiment, separate measurement identities are defined for signal strength measurement/reporting and handover evaluation/reporting. In one embodiment, the maximum number of CSG/hybrid cells and the type of CSG/hybrid cells for which the UE should report the handover preparation information is configured by the eNS. One implementation of this is shown by the parameters maxReportCSCHybridCells and maxReportType in the exemplary HoEvalConfig IE below. In yet another embodiment, the UE can be configured to report the handover preparation information of every cell as ordered by the eNB in HoEvalConfig E.

Exemplary RRCConnectianReconfiguration Message:

The following is an example of signaling from the eNB to the UE to order handover evaluation on specific neighbor cells.

TABLE 3

```
-- ASN1START
RRCConnectionReconfiguration ::=        SEQUENCE {
        rrc-TransactionIdentifier              RRC-TransactionIdentifier,
        criticalExtensions                     CHOICE {
            c1                                                     CHOICE{
                rrcConnectionReconfiguration-r8 RRCConnectionReconfiguration-r8-IEs,
                rrcConnectionReconfiguration-r9 RRCConnectionReconfiguration-r9-IEs,
                    spare6 NULL, spare5 NULL, spare4 NULL,
                    spare3 NULL, spare2 NULL, spare1 NULL
            },
            criticalExtensionsFuture           SEQUENCE { }
        }
}
RRCConnectionReconfiguration-r8-IEs ::= SEQUENCE {
        measConfig                   MeasConfig          OPTIONAL,  -- Need ON
        mobilityControlInfo          MobilityControlInfo OPTIONAL,  -- Cond HO
        dedicatedInfoNASList         SEQUENCE (SIZE(1 ... maxDRB)) OF
                                     DedicatedInfoNAS    OPTIONAL,-- Cond nonHO
        radioResourceConfigDedicated RadioResourceConfigDedicated    OPTIONAL, -
                                                         - Cond HO-toEUTRA
        securityConfigHO             SecurityConfigHO    OPTIONAL,  -- Cond HO
        nonCriticalExtension         SEQUENCE { }        OPTIONAL   -- Need OP
}
RRCConnectionReconfiguration-r9-IEs ::= SEQUENCE {
        measConfig                   MeasConfig          OPTIONAL,  -- Need ON
        hoEvalConfig                 HoEvalConfig        OPTIONAL,  -- Need ON
        mobilityControlInfo          MobilityControlInfo OPTIONAL,  -- Cond HO
        dedicatedInfoNASList         SEQUENCE (SIZE(1 ... maxDRB)) OF
                                     DedicatedInfoNAS    OPTIONAL,-- Cond nonHO
```

TABLE 3-continued

```
        radioResourceConfigDedicated    RadioResourceConfigDedicated    OPTIONAL, -
                                                                        - Cond HO-toEUTRA
        securityConfigHO                SecurityConfigHO                OPTIONAL,  -- Cond HO
        nonCriticalExtension            SEQUENCE { }                    OPTIONAL   -- Need OP
}
SecurityConfigHO ::=                    SEQUENCE {
    handoverType                            CHOICE {
        intraLTE                                SEQUENCE {
            securityAlgorithmConfig                 SecurityAlgorithmConfig
                                                    OPTIONAL,  -- Need OP
            keyChangeIndicator                      BOOLEAN,
            nextHopChainingCount                    NextHopChainingCount
        },
        interRAT                                SEQUENCE {
            securityAlgorithmConfig                 SecurityAlgorithmConfig,
            nas-SecurityParamToEUTRA                OCTET STRING (SIZE(6))
        }
    },
    ...
}
-- ASN1STOP
```

The following is an example of a HoEvalConfig information element:

TABLE 4

```
-- ASN1START
HoEvalConfig ::=        SEQUENCE {
    measId              MeasId,             OPTIONAL,  -- Need ON
    hoEvalCellList      HoEvalCellList      OPTIONAL,  -- Need ON
    maxReportType       BIT STRING (SIZE (2))   OPTIONAL,
    maxReportCSGHydridCells     INTEGER         (1 . . . maxCellReportCSGHybrid)
OPTIONAL,
    ...
}
HoEvalCellList ::=      SEQUENCE (SIZE (1 . . . maxHoEvalCell)) OF HoEvalCell
HoEvalCell ::=      SEQUENCE {
    neighborCellId      PhysCellId          OPTIONAL,           -- Need ON
}
-- ASN1STOP
```

The following table describes exemplary HoEvalConfig field descriptions for the above HoEvalConfig IE:

TABLE 5

| HoEvalConfig field descriptions |
|---|
| neighborCellId |
| Physical cell identity of a cell in neighboring cell list where the UE should perform handover evaluation and reporting based on the reporting configuration specified for MeasId. |
| measId |
| Identifies the measurement identity for which the handover evaluation and reporting correspond to. |
| maxReportType |
| 00: the UE shall report HO preparation information of up to maxReportCSGHybridCells CSG or hybrid cells
01: the UE shall report HO preparation information of up to maxReportCSGHybridCells allowed CSG cells or hybrid cells whose CSG ID belongs to the UE's allowed CSG list.
10: the UE shall report HO preparation information of up to maxReportCSGHybridCells allowed CSG cells or hybrid cells
11: reserved |
| maxReportCSGHybridCells |
| Max number of CSG or hybrid cells, excluding the serving cell, to include in the measurement report |

The following is another example of a HoEvalConfig information element:

TABLE 6

```
-- ASN1START
HoEvalConfig ::=        SEQUENCE {
    measId              MeasId,                         OPTIONAL,   -- Need ON
    measReportId        MeasReportId,                   OPTIONAL,   -- Need ON
    hoEvalCellList      BIT STRING (SIZE(maxHoEvalCell))    OPTIONAL,
                                                                    -- Need ON
    maxReportType       BIT STRING (SIZE (2))   OPTIONAL,
    maxReportCSGHybridCellsINTEGER (1 . . . maxCellReportCSGHybrid)
        OPTIONAL,
    . . .
}
-- ASN1STOP
```

The following table describes another exemplary HoEvalConfig field descriptions for the above HoEvalConfig IE:

TABLE 7

| HoEvalConfig field descriptions |
| --- |
| measId |
| Identifies the measurement identity for which the handover evaluation and reporting correspond to. |
| measReportId |
| An identity associated with a previous measurement report from the UE. |
| hoEvalCellList |
| A bitmap indicating the neighboring cells where the UE should perform handover evaluation and reporting based on the reporting configuration specified for MeasId. A "1" denotes that the UE should perform handover evaluation and reporting on the corresponding neighbor cell. The bitmap is interpreted as follows:<br>Starting from the first/leftmost bit in the bitmap, each bit corresponds to a neighbor cell included in a previous mesurement report from the UE that corresponds to the MeasReportId, in sequential order. |
| maxReportType |
| 00: the UE shall report HO preparation information of up to maxReportCSGHybridCells CSG or hybrid cells<br>01: the UE shall report HO preparation information of up to maxReportCSGHybridCells allowed CSG cells or hybrid cells whose CSG ID belongs to the UE's allowed CSG list.<br>10: the UE shall report HO preparation information of up to maxReportCSGHybridCells allowed CSG cells or hybrid cells<br>11: reserved |
| maxReportCSGHybridCells |
| Max number of CSG or hybrid cells, excluding the serving cell, to include in the measurement report |

The following is yet another example of a HoEvalConfig information element:

TABLE 8

```
-- ASN1START
HoEvalConfig ::=        SEQUENCE {
    measId              MeasId,                         OPTIONAL,   -- Need ON
    measReportId        MeasReportId,                   OPTIONAL,   -- Need ON
    numBestCells        INTEGER (1 . . . maxBestCells)  OPTIONAL,   -- Need ON
    maxReportType       BIT STRING (SIZE (2))   OPTIONAL,
    maxReportCSGHybridCells     INTEGER     (1 . . . maxCellReportCSGHybrid)
        OPTIONAL,
    . . .
}
-- ASN1STOP
```

The following table describes another exemplary HoEvalConfig field descriptions for the above HoEvalConfig IE:

TABLE 9

HoEvalConfig field descriptions measId

Identifies the measurement identity for which the handover evaluation and reporting correspond to.
measReportId An identity associated with a previous measurement report from the UE.
numBestCells The number of cells with the strongest signal strength in the UE's previous measurement report identified by measReportId, for which the UE should perform handover evaluation and reporting.
maxReportType 00: the UE shall report HO preparation information of up to maxReportCSGHybridCells CSG or hybrid cells
01: the UE shall report HO preparation information of up to maxReportCSGHybridCells allowed CSG cells or hybrid cells whose CSG ID belongs to the UE's allowed CSG list.
10: the UE shall report HO preparation information of up to maxReportCSGHybridCells allowed CSG cells or hybrid cells
11: reserved
maxReportCSGHybridCells Max number of CSG or hybrid cells, excluding the serving cell, to include in the measurement report The following is an example of a MeasResults information element:

TABLE 10

```
-- ASN1START
MeasResults ::=           SEQUENCE {
      measId                  MeasId,
      measResultServCell      SEQUENCE {
          rsrpResult              RSRP-Range,
          rsrqResult              RSRQ-Range
      },
      measResultNeighCells    CHOICE {
          measResultListEUTRA     MeasResultListEUTRA,
          measResultListUTRA      MeasResultListUTRA,
          measResultListGERAN     MeasResultListGERAN,
          measResultsCDMA2000     MeasResultsCDMA2000,
          ...
      }                                                   OPTIONAL,
      measReportId            MeasReportID                OPTIONAL,
      ...
}
MeasResultListEUTRA::=SEQUENCE (SIZE (1 ... maxCellReport)) OF MeasResultEUTRA
MeasResultEUTRA ::=       SEQUENCE {
      physCellId              PhysCellId,
      cgi-Info                SEQUENCE {
          cellGlobalId            CellGlobalIdEUTRA,
          trackingAreaCode        TrackingAreaCode,
          plmn-IdentityList       PLMN-IdentityList2       OPTIONAL
      }                                                    OPTIONAL,
      measResult              SEQUENCE {
          rsrpResult              RSRP-Range              OPTIONAL,
          rsrqResult              RSRQ-Range              OPTIONAL,
          ...
      }
}
...
```

The following table describes exemplary MeasResults field descriptions for the above MeasResults IE. These exemplary MeasResults field descriptions correspond to the second alternative of the HoEvalConfig IE, provided above.

TABLE 11

MeasResults field descriptions measReportId

An identity associated with the measurement report

The above embodiments relate to SI acquisition or handover evaluation control with respect to unscheduled or autonomous gaps. Attention is now turned to embodiments relating to SI acquisition or handover evaluation control with respect to scheduled gaps.

If scheduled gaps are used for handover evaluation, the eNB may need to explicitly signal to the UE the radio j frame(s) and sub-frame(s) used for handover evaluation of a neighbor cell. The HoEvalConfig IE shown above may be modified to include the scheduled gaps, i.e., HoEvalGapConfig, as shown below in tables 14-15. The scheduled gap, HoEvalGapConfig, can be specified for each neighbor cell included in HoEvalConfig. The scheduled gap can also be specified as a common configuration for all the neighbor cells included in HoEvalConfig. A specific embodiment of the scheduled gap configuration in HoEvalGapConfig is shown below with respect to the example of HoEvalConfig IE for the case of scheduled gaps. The UE may consider the scheduled gaps for a particular neighbor cell to be released after the UE has successfully acquired the MIB and SIB1 information of the neighbor cell. The UE may indicate to the eNB when it has successfully acquired the MIB and SIB1 information of the neighbor cell. In one embodiment, the existing MeasGapConfig in Release 8 may be used instead of HoEvalGabConfig in the HoEvalConfig IE, as shown below in the example of a HoEvalConfig IE for the case of scheduled gaps.

The following is an example of a HoEvalConfig information element:

TABLE 12

```
-- ASN1START
HoEvalConfig ::=     SEQUENCE {
        measId                  MeasId,             OPTIONAL,   -- Need ON
        hoEvalCellList          HoEvalCellList      OPTIONAL,   -- Need ON
        hoEvalGapConfig         HoEvalGapConfig     OPTIONAL,   -- Need ON
        maxReportType           BIT STRING (SIZE (2))      OPTIONAL,
        maxReportCSGHybridCells         INTEGER         (1 . . . maxCellReportCSGHybrid)
OPTIONAL,
        . . .
}
HoEvalCellList ::=   SEQUENCE (SIZE (1 . . . maxHoEvalCell)) OF HoEvalCell
HoEvalCell ::=       SEQUENCE {
        neighborCellId          PhysCellId          OPTIONAL,   -- Need ON
        hoEvalGapConfig         HoEvalGapConfig     OPTIONAL,   -- Need ON
}
-- ASN1STOP
```

The following is an example of HoEvalConfig field descriptions for the above information element

TABLE 13

HoEvalConfig field descriptions neighborCellId

Physical cell identity of a cell in neighboring cell list where the UE should perform handover evaluation and reporting based on the reporting configuration specified for MeasId.

measId

Identifies the measurement identity for which the handover evaluation and reporting correspond to.

maxReportType

00: the UE shall report HO preparation information of up to maxReportCSGHybridCells CSG or hybrid cells
01: the UE shall report HO preparation information of up to maxReportCSGHybridCells allowed CSG cells or hybrid cells whose CSG ID belongs to the UE's allowed CSG list.
10: the UE shall report HO preparation information of up to maxReportCSGHybridCells allowed CSG cells or hybrid cells
11: reserved maxReportCSGHybridCells Max number of CSG or hybrid cells, excluding the serving cell, to include in the measurement report The following is an example of a HoEvalGapConfig information element:

TABLE 14

```
-- ASN1START
HoEvalGapConfig ::=     CHOICE {
    release             NULL,
    setup               SEQUENCE {
        gapOffset           SEQUENCE {
            gp0                 INTEGER (0 ... 39)      OPTIONAL,
            gp1                 INTEGER (0 ... 79)      OPTIONAL,
            ...
        }
    }
}
-- ASN1STOP
```

The following is an example of HoEvalGapConfig field descriptions for the above information element:

TABLE 15

| HoEvalGapConfig field descriptions |
|---|
| gapOffset |
| Value gapOffset of gp0 corresponds to gap offset of Gap Pattern Id "0" with MGRP = 40 ms, gapOffset of gp1 corresponds to gap offset of Gap Pattern Id "1" with MGRP = 80 ms. Also used to specify the measurement gap pattern to be applied, as defined in TS 36.133 [16]. |

Measurement Reports

Attention is now turned to measurement reports with respect to SI acquisition or handover evaluation control. With respect to such measurement reports, in some embodiments, the Release 8 measurement report may be modified to include additional information related to CSG/hybrid cells. Measurement reports may be related to blocks 208, 210, and 216 of FIG. 2.

In an embodiment, a UE may indicate whether a neighbor cell belongs to an allowed CSG. This information can be factored in the eNB decision regarding the handover target, in conjunction with the reported signal strength (RSRP/RSRQ).

In another embodiment, the UE may indicate whether a neighbor cell belongs to a preferred CSG. This information can be factored in the eNB decision regarding the handover target, in conjunction with the reported signal strength (RSRP/RSRQ).

In yet another embodiment, the UE may indicate whether a neighbor CSG cell belongs to a certain provisioned area/environment, such as a high mobility area, or if the neighbor CSG cell has a certain CSG Type. This information can be factored in the eNB decision regarding the handover target, in conjunction with the reported signal strength (RSRP/RSRQ).

In still another embodiment, the UE may report the CSG ID of a neighbor cell if the neighbor cell is a CSG cell or hybrid cell. This information, received by the eNB, can be sent to the MME for access control. If the CSG ID of a neighbor cell is included in the measurement report and the PCI of the cell is not within the range of PCI for CSG cell, the eNB can deduce that the reported cell is a hybrid cell. In one embodiment, an explicit field may be introduced to indicate whether a reported cell is a CSG cell or hybrid cell.

In order for the eNB to assess the validity of the handover preparation information sent from the UE, when a UE reports the handover preparation information, the UE can indicate whether the information is obtained based on handover evaluation performed within a predefined duration prior to when the measurement report is sent. Depending on whether handover evaluation is performed within or outside the predefined duration, the eNB can decide whether the preliminary access check is still valid. Alternatively, the UE might not include any handover preparation information of a cell in the measurement report if the information is obtained outside of the predefined duration prior to when the measurement report is sent. The predefined duration within which the handover preparation information is considered valid can be signaled by the eNB to the UE via dedicated RRC signaling as part of a measurement identity or reporting configuration; or via broadcast system information. In yet another embodiment, the UE can determine that the handover preparation information is valid for a cell if the UE detects, through geo-location information or other means, that it is located at close proximity with the previously stored location corresponding to a particular PCI.

Shown below is an exemplary MeasResults information element. This MeasResults IE can be further enhanced to include the above information, as shown in the MeasResults field descriptions. A HoEvalvation field may be included to indicate whether the UE has performed handover evaluation and the associated preliminary access check within a predefined duration prior to sending the measurement report. The eNB can use the reported information to decide if handover evaluation is needed for a particular neighbor cell.

The following is an example of a MeasResults information element.

TABLE 16

```
-- ASN1START
MeasResults ::=                    SEQUENCE {
        measId                     MeasId,
        measResultServCell         SEQUENCE {
            rsrpResult                 RSRP-Range,
            rsrqResult                 RSRQ-Range
        },
        measResultNeighCells       CHOICE {
            measResultListEUTRA        MeasResultListEUTRA,
            measResultListUTRA         MeasResultListUTRA,
            measResultListGERAN        MeasResultListGERAN,
            measResultsCDMA2000        MeasResultsCDMA2000,
            . . .
        }                                                       OPTIONAL,
        measReportId               MeasReportID                 OPTIONAL,
        . . .
}
MeasResultListEUTRA::=SEQUENCE (SIZE (1 . . . maxCellReport)) OF MeasResultEUTRA
        MeasResultEUTRA ::=        SEQUENCE {
            physCellId                 PhysCellId,
            cgi-Info                   SEQUENCE {
            cellGlobalId               CellGlobalIdEUTRA,
            trackingAreaCode           TrackingAreaCode,
            plmn-IdentityList          PLMN-IdentityList2       OPTIONAL
        }                                                       OPTIONAL,
            measResult                 SEQUENCE {
            rsrpResult                 RSRP-Range               OPTIONAL,
            rsrqResult                 RSRQ-Range               OPTIONAL,
            hoEvaluation               BIT STRING (SIZE (2))
OPTIONAL,
            hoEvalElapseTime           ENUMERATED {hour1, hour2, hour4, hour8, hour6,
hour32}     OPTIONAL,
            csgId                      CsgId                    OPTIONAL,
            allowedCsg                 BOOLEAN                  OPTIONAL,
            preferredCsg               BOOLEAN                  OPTIONAL,
            csgType                    Character                OPTIONAL,
            . . .
        }
}
. . .
```

The following is an example of field descriptions for the above MeasResults information element,

TABLE 17

| MeasResults field descriptions |
| --- |
| measReportId |
| An identity associated with the measurement report |
| hoEvaluation |
| 00: to indicate that handover evaluation is performed by the UE within a predefined duration prior to this measurement report and the neighbor cell information included in the measurement report is obtained from handover evaluation.<br>01: to indicate that handover evaluation is not performed by the UE within a predefined duration prior to this measurement report and the neighbor cell information included in the measurement report is obtained from handover evaluation that is performed outside of the predefined duration prior to this measurement report.<br>10: to indicate that the neighbor cell information provided in the measurement report is not based on handover evaluation, but by other means, e.g. fingerprinting information.<br>11: reserved |
| hoEvalElapseTime |
| The time that has elapsed since the UE last performs the handover evaluation to the time when measurement report is sent. hour1 indicates one hour, hour2 indicates two hours and so on. |
| csgId |
| CSG ID of the neighbor cell |
| allowedCsg |
| Set to 'True' if the neighbor CSG or hybrid cell belongs to the UE's allowed CSG list. |
| preferredCsg |

TABLE 17-continued

MeasResults field descriptions

Set to 'True' if the neighbor CSG or hybrid cell is a preferred CSG or hybrid cell or belongs to the UE's preferred CSG list.
CsgType This is the CSG Type associated with a CSG identity in the UE's allowed CSG Lists and this CSG Type can be configured by operator or enterprise. Example of CSG Type includes train, office, campus, etc.. The CSG type allows the UE to be configured to perform measurement reporting when the UE is in certain environment as specified by CsgType.

Prioritization of Neighbor CSG/Hybrid Cells

Attention is now turned to prioritization of neighbor CSG/Hybrid cells. This embodiment may be related to blocks 208, 210, and 216 of FIG. 2.

In addition to the UE indicating whether a reported cell belongs to its preferred CSG as discussed above, it is also possible to introduce multiple priority or preferential levels associated with different CSGs in the UE's allowed CSG list. For example, a CSG corresponding to a user's home may have the highest priority or preferential level, whereas a CSG corresponding to a café with a discount access fee may have second priority or preferential level.

In order to facilitate decision making at the serving eNB as to which neighbor cell it should order the UE to perform handover evaluation on, as well as which target HeNB the UE should be handed over to, the UE can provide additional information to the serving eNB regarding prioritization or preferential level of a neighbor CSG/hybrid cell. For example, the UE can determine the prioritization level of a neighbor CSG/hybrid cell based on its subscription type to the CSG, such as home cell, office cell, or any number of other subscription types.

In an embodiment, the eNB may be the device that makes decisions regarding the target handover cell. Based on the priority/preferential level indicated by the UE on each reported cell, the eNB can factor the information in the decision making process on the target handover cell. The eNB may also consider other factors, such as signal strength reported by the UE, loading condition, expected interference level, and other information.

In an embodiment, the measurement report may be further enhanced as shown in the MeasResults information element, below. The eNB can make decisions regarding handover evaluation and handover target based on the reported signal strength, as well as based on the priority level of a neighbor CSG/hybrid cell.

The following is an example of a MeasResults information element for this embodiment:

TABLE 18

```
-- ASN1START
MeasResults ::=                SEQUENCE {
    measId                        MeasId,
    measResultServCell            SEQUENCE {
        rsrpResult                    RSRP-Range,
        rsrqResult                    RSRQ-Range
    },
    measResultNeighCells          CHOICE {
        measResultListEUTRA           MeasResultListEUTRA,
        measResultListUTRA            MeasResultListUTRA,
        measResultListGERAN           MeasResultListGERAN,
        measResultsCDMA2000           MeasResultsCDMA2000,
        ...
    }                                                             OPTIONAL,
    measReportId                  MeasReportID                    OPTIONAL,
    ...
}
MeasResultListEUTRA::=SEQUENCE (SIZE (1 ... maxCellReport)) OF MeasResultEUTRA
MeasResultEUTRA ::=       SEQUENCE {
    physCellId                    PhysCellId,
    cgi-Info                      SEQUENCE {
        cellGlobalId                  CellGlobalIdEUTRA,
        trackingAreaCode              TrackingAreaCode,
        plmn-IdentityList             PLMN-IdentityList2          OPTIONAL
    }                                                             OPTIONAL,
    measResult                    SEQUENCE {
        rsrpResult                    RSRP-Range                  OPTIONAL,
        rsrqResult                    RSRQ-Range                  OPTIONAL,
        hoEvaluation BIT STRING (SIZE (2))                        OPTIONAL,
        hoEvalElapseTime      ENUMERATED {hour1, hour2, hour4, hour8, hour6,
hour32}     OPTIONAL,
        csgId                         CsgId                       OPTIONAL,
        csgPriorityLevel              INTEGER (0, 1, ..., 8)      OPTIONAL,
        csgType                       Character                   OPTIONAL,
        ...
    }
}
...
```

The following is an example of MeasResults field descriptions for the above information element that includes a prioritization level of a neighbor CSG/hybrid cell:

TABLE 19

MeasResults field descriptions measReportId

An identity associated with the measurement report
hoEvaluation

00: to indicate that handover evaluation is performed by the UE within a predefined duration prior to this measurement report and the neighbor cell information included in the measurement report is obtained from handover evaluation.
01: to indicate that handover evaluation is not performed by the UE within a predefined duration prior to this measurement report and the neighbor cell information included in the measurement report is obtained from handover evaluation that is performed outside of the predefined duration prior to this measurement report.
10: to indicate that the neighbor cell information provided in the measurement report is not based on handover evaluation, but by other means, e.g. fingerprinting information.
11: reserved
hoEvalElapseTime The time that has elapsed since the UE last performs the handover evaluation to the time when measurement report is sent. hour1 indicates one hour, hour2 indicates two hours and so on.
csgId CSG ID of the neighbor cell
csgPriorityLevel Priority level of the neighbor CSG or hybrid cell. The high the value, the higher the priority. Set to 0 to indicate the neighbor CSG or hybrid cell does not belong to the UE's allowed CSG list.
CsgType This is the CSG Type associated with a CSG identity in the UE's allowed CSG Lists and this CSG Type can be configured by operator or enterprise. Example of CSG Type includes train, office, campus, etc.. The CSG type allows the UE to be configured to perform measurement reporting when the UE is in certain environment as specified by CsgType.

Reporting of Not Mowed CSG Cells

Attention is now turned to the reporting of not allowed CSG cells. This embodiment may be related to block 204 of FIG. 2.

As described above with respect to signal strength measurement control, the eNB can configure a measurement report trigger of a UE based on existing events defined in Release 8, or based on new events. If existing events are used, the reporting trigger might not be based on whether a neighbor cell belongs to the UE's allowed CSG list. Thus, reporting may be included for 'not allowed' CSG cells meeting the criteria for the existing events.

Different trigger parameters values may be used for allowed and not-allowed CSG cells. This distinction may be made because the measurement reporting of allowed CSG cells may be mainly for the purpose of handover, whereas the measurement reporting of not-allowed CSG cells may be for the purpose of an interference condition survey by the serving eNB. The values of trigger parameters for not allowed CSG cells may be the same or different than those of the macro cell for the purpose of an interference condition survey. When applying the appropriate measurement reporting triggers, the UE can use its stored fingerprinting information, or information obtained from a prior preliminary access check, to determine if a detected PCI corresponds to a macro cell, an allowed CSG cell, a hybrid cell, or a not allowed CSG cell.

In a specific embodiment, the ReportConfigEUTRA IE described above with respect to signal strength measurement control can be further enhanced, as shown in the ReportConfigEUTRA embodiment below. In this case, three flags are introduced, allowedCsgHybridIndicator, not allowedCsgIndicator, and macroIndicator. These flags may be used to indicate if the reporting configuration applies to allowed CSG or hybrid cells, and/or not allowed CSG cells, and/or macro cells, respectively. The UE may use its stored fingerprinting information or information obtained from a prior preliminary access check to determine if a detected PCI corresponds to an allowed CSG cell, a hybrid cell, or a not allowed CSG cell.

The following is an example of an enhanced ReportConfigEUTRA IE:

TABLE 20

```
ASN1START
ReportConfigEUTRA ::=        SEQUENCE {
        triggerType                  CHOICE {
            event                        SEQUENCE {
                eventId                      CHOICE {
                    eventA1                      SEQUENCE {
```

TABLE 20-continued

```
                    a1-Threshold            ThresholdEUTRA
                },
                eventA2                     SEQUENCE {
                    a2-Threshold            ThresholdEUTRA
                },
                eventA3                     SEQUENCE {
                    a3-Offset               INTEGER (-30 ... 30),
                    reportOnLeave           BOOLEAN
                },
                eventA4                     SEQUENCE {
                    a4-Threshold            ThresholdEUTRA
                },
                eventA5                     SEQUENCE {
                    a5-Threshold1           ThresholdEUTRA,
                    a5-Threshold2           ThresholdEUTRA
                },
                eventA6                     SEQUENCE {
                    a6-Offset               INTEGER (-30 ... 30),
                    reportOnLeave           BOOLEAN
                },
                eventA7                     SEQUENCE {
                    a7-Offset               INTEGER (-30 ... 30),
                    reportOnLeave           BOOLEAN
                },
                eventA8                     SEQUENCE {
                    a8-Threshold            ThresholdEUTRA
                },
                eventA9                     SEQUENCE {
                    a9-Threshold            ThresholdEUTRA
                },
                eventA10                    SEQUENCE {
                    a10-Threshold1          ThresholdEUTRA,
                    a10-Threshold2          ThresholdEUTRA
                },
                eventA11                    SEQUENCE {
                    a11-Threshold1          ThresholdEUTRA,
                    a11-Threshold2          ThresholdEUTRA
                },
                eventA12                    SEQUENCE {
                    a12-CsgType             ENUMERATED      {Train, Plane, Bus},
                    a12-Threshold           ThresholdEUTRA
                },
                ...
            },
            hysteresis                      Hysteresis,
            timeToTrigger                   TimeToTrigger
        },
        periodical                          SEQUENCE {
            purpose                         ENUMERATED {
                                                reportStrongestCells, reportCGI}
        }
    },
    triggerQuantity         ENUMERATED {rsrp, rsrq},
    reportQuantity          ENUMERATED {sameAsTriggerQuantity, both},
    maxReportCells          INTEGER (1 ... maxCellReport),
    reportInterval          ReportInterval,
    reportAmount            ENUMERATED {r1, r2, r4, r8, r16, r32, r64, infinity},
    allowedCsgHybridIndicator  BOOLEAN             OPTIONAL,
    not allowedCsgIndicator    BOOLEAN             OPTIONAL,
    macroIndicator             BOOLEAN             OPTIONAL,
    csgCellOffset              Q-OffsetRange       OPTIONAL,
    prioritizedReport          BOOLEAN             OPTIONAL,
    maxReportCellsMacro        INTEGER (1 ... maxCellReportMacro) OPTIONAL,
    maxReportCellCSGHybrid     INTEGER (1 ... maxCellReportCSGHybrid) OPTIONAL,
    maxReportCellCSGHybridPreferred    INTEGER (1 ... maxCellReportCSGHybrid) OPTIONAL,
    ...
}
ThresholdEUTRA ::=      CHOICE{
    threshold-RSRP          RSRP-Range,
    threshold-RSRQ          RSRQ-Range
}
ASN1STOP
```

The following is an example of ReportConfigEUTRA field descriptions for the above IE and is also an example of CSG/hybrid cell specific reporting configuration,

TABLE 21

| ReportConfigEUTRA field descriptions |
| --- |
| eventId |
| Choice of E-UTRA event triggered reporting criteria. <br> aN-ThresholdM |
| Threshold to be used in EUTRA measurement report triggering condition for event number aN. If multiple thresholds are defined for event number aN, the thresholds are differentiated by M. <br> a3-Offset |
| Offset value to be used in EUTRA measurement report triggering condition for event a3. The actual value is IE value * 0.5 dB. <br> reportOnLeave |
| Indicates whether or not the UE shall initiate the measurement reporting procedure when the leaving condition is met for a cell in cellsTriggeredList, as specified in 5.5.4.1. <br> triggerQuantity |
| The quantities used to evaluate the triggering condition for the event. The values rsrp and rsrq correspond to Reference Signal Received Power (RSRP) and Reference Signal Received Quality (RSRQ), see TS 36.214 [48]. <br> timeToTrigger |
| Time during which specific criteria for the event needs to be met in order to trigger a measurement report. <br> reportQuantity |
| The quantities to be included in the measurement report. The value both means that both the rsrp and rsrq quantities are to be included in the measurement report. <br> maxReportCells |
| Max number of cells, excluding the serving cell, to include in the measurement report. <br> reportAmount |
| Number of measurement reports applicable for triggerType 'event' as well as for triggerType 'periodical'. In case purpose is set to 'reportCGI' only value 1 applies. <br> ThresholdEUTRA |
| For RSRP: RSRP based threshold for event evaluation. <br> For RSRQ: RSRQ based threshold for event evaluation. <br> allowedCsgHybridIndicator |
| Set to 'True' to indicate that the reporting configuration should be used for allowed CSG cells and hybrid cells whose CSG ID is in the UE's allowed CSG list. <br> not allowedCsgIndicator |
| Set to 'True' to indicate that the reporting configuration should be used for not allowed CSG cells and hybrid cells whose CSG ID is not in the UE's allowed CSG list. This field is only included if the eventId is set to eventA3, eventA4 and eventA5. <br> macroIndicator |
| Set to 'True' to indicate that the reporting configuration should be used for macro cells. <br> csgCellOffset |
| CSG cell offset applicable to a specific neighboring CSG cell. Value dB-24 corresponds to −24 dB, dB-22 ocrresponds to −22 dB and so on. This field is only included if csgHybridIndicator is set to 'True'. <br> prioritizedReporting |
| Set to 'True' to indicate that prioritized reporting should be used. <br> a12-CsgType |
| This is the CSG Type associated with a CSG identity in the UE's allowed CSG Lists and this CSG Type can be configured by operator or enterprise. Example of CSG Type includes train, office, campus, etc.. The CSG type allows the UE to be configured to perform measurement reporting when the UE is in certain environment as specified by a12-CsgType. <br> maxReportCellsMacro |
| Max number of macro cells, excluding the serving cell, to include in the measurement report. <br> maxReportCellsCSGHybrid |

TABLE 21-continued

ReportConfigEUTRA field descriptions

Max number of CSG or hybrid cells, excluding the serving cell, to include in the measurement report.
maxReportCellsCSGHybridPreferred Max number of CSG or hybrid cells whose CSG IDs are in the UE's allowed CSG list, excluding the serving cell, to include in the measurement report.

Macro eNB Triggered Measurement

Attention is now turned to macro eNB triggered measurement. This embodiment may be related to block 204 of FIG. 2.

Because a UE may not have stored fingerprinting information of a CSG cell that has just been powered on, the CSG cell might not be in the UE's list of allowed CSG cells or preferred CSG cells. In this case, the reporting configuration and trigger events, described above, that apply to allowed CSG cells might not be used by the UE to trigger measurement reporting of the newly powered-on CSG cell. The reporting configuration and trigger events are described above with respect to signal strength measurement control and with respect to measurement reporting of not allowed CSG cells. In one implementation, when a HeNB registers with the MME (for example, because it has just been powered on), the MME can inform one or more eNBs of the information of the newly powered-on HeNB. Examples of such information include, but are not limited to, PCI, CGI, CSG ID, and access mode. The eNB can then specifically instruct a UE to perform measurement reporting of a particular neighbor CSG cell using the reporting configuration and trigger criteria specified for allowed CSG cells. This may be beneficial because the MME may not be aware of the relative locations and coverages of the eNB and the HeNB, and hence may inform an eNB which has no overlapping coverage with the HeNB. This embodiment allows an eNB to attempt to confirm whether or not the HeNB may be a candidate cell for handovers for UEs being served by the eNB.

Similarly, the UE may not have stored fingerprinting information of a hybrid cell that has just been powered on. In this case, the reporting configuration and trigger events described above that apply to hybrid cells might not be used by the UE to trigger measurement reporting of the newly powered-on hybrid cell. To address this issue, the eNB may specifically instruct a UE to perform measurement reporting of a particular neighbor hybrid cell using the reporting configuration and trigger criteria specified for hybrid cells.

In addition, the eNB may also instruct the UE to perform handover evaluation on the newly powered-on CSG or hybrid cell. The methods described above can be used by the eNB to indicate the newly powered-on CSG or hybrid cell on which the UE should perform handover evaluation, as well as the corresponding measurement identify and associated reporting configuration.

The methods described above apply not just to newly powered-on CSG or hybrid cells, or subsequent to notification of a HeNB by an MME to an eNB, but can also be applied in other cases, in another case, the eNB may want a UE to perform a measurement report of a neighbor cell for purposes such as interference survey, e.g. triggered by high interference received at the eNB; or the eNB is aware that the UE does not have stored fingerprinting information of a CSG or hybrid cell.

The MeasObjectEUTRA of Release 8 may be enhanced to include the list of CSG cells that the eNB instructs the UE to perform measurement reporting and/or handover evaluation. An example of such an enhanced MeasObjectEUTRA IE is shown below:

TABLE 22

```
-- ASN1START
MeasObjectEUTRA ::=      SEQUENCE {
        carrierFreq             ARFCN-ValueEUTRA,
        allowedMeasBandwidth    AllowedMeasBandwidth,
        presenceAntennaPort1    PresenceAntennaPort1,
        neighCellConfig         NeighCellConfig,
        offsetFreq              Q-OffsetRange            DEFAULT dB0,
        -- Neighbor cell list
        cellsToRemoveList       CellIndexList            OPTIONAL, -- Need ON
        cellsToAddModList       CellsToAddModList        OPTIONAL, -- Need ON
        -- Black list
        blackCellsToRemoveList  CellIndexList            OPTIONAL, -- Need ON
        blackCellsToAddModList  BlackCellsToAddModList   OPTIONAL, -- Need ON
        cellForWhichToReportCGI PhysCellId               OPTIONAL, -- Need ON
        allowedCsgHybridCellsToMeasureList    AllowedCsgHybridCellsToMeasureList
        OPTIONal,    -- Need ON
        hybridCellsToMeasureList HybridCellsToMeasureList OPTIONAL,  -- Need ON
        ...
}
CellsToAddModList ::=    SEQUENCE (SIZE (1 ... maxCellMeas)) OF CellsToAddMod
CellsToAddMod ::=  SEQUENCE {
        cellIndex               INTEGER (1 ... maxCellMeas),
        physCellId              PhysCellId,
        cellIndividualOffset    Q-OffsetRange
}
BlackCellsToAddModList::=SEQUENCE(SIZE(1 ... maxCellMeas))OFBlackCellsToAddMod
BlackCellsToAddMod ::=   SEQUENCE {
        cellIndex               INTEGER (1 ... maxCellMeas),
        physCellIdRange         PhysCellIdRange
```

TABLE 22-continued

```
}
AllowedCsgHybridCellsToMeasureList ::= SEQUENCE (SIZE (1 . . . maxCsgCellMeas)) OF
        AllowedCsgHybridCellsToMeasure
AllowedCsgHybridCellsToMeasure ::=     SEQUENCE {
        cellIndex              INTEGER (1 . . . maxCsgCellMeas),
        physCellId             PhysCellId,
}
HybridCellsToMeasureList ::=     SEQUENCE   (SIZE   (1 . . . maxCsgCellMeas))   OF
HybridCellsToMeasure
HybridCellsToMeasure ::=             SEQUENCE {
        cellIndex       INTEGER (1 . . . maxCsgCellMeas),
        physCellId      PhysCellId,
}
-- ASN1STOP
```

An example of field descriptions for the above MeasObjectEUTRA IE is provided below. These exemplary field descriptions may be used to indicate the specific CSG cells for which the UE should perform measurement reporting.

TABLE 23

| MeasObjectEUTRA field descriptions |
| --- |
| carrierFreq |
| Identifies E-UTRA carrier frequency for which this configuration is valid.<br>offsetFreq |
| Offset value applicable to the carrier frequency. Value dB-24 corresponds to −24 dB, dB-22 corresponds to −22 dB and so on.<br>cellsToRemoveList |
| List of cells to remove from the neighboring cell list.<br>cellsToAddModList |
| List of cells to add/modify in the neighboring cell list.<br>cellIndex |
| Entry index in the neighboring cell list. An entry may concern a range of cells, in which case this value applies to the entire range.<br>physCellId |
| Physical cell identity of a cell in neighboring cell list.<br>CellIndividualOffset |
| Cell individual offset applicable to a specific neighboring cell. Value dB-24 corresponds to −24 dB, dB-22 corresponds to −22 dB and so on.<br>blackCellsToRemoveList |
| List of cells to add/modify in the black list of cells.<br>physCellIdRange |
| Physical cell identity or a range of physical cell identities of cells in the black list.<br>allowedCsgHybridCellsToMeasureList |
| List of CSG cells that the UE should perform measurement reporting based on reporting configuration specified for allowed CSG cells or hybrid cells whose CSG IDs are in the UE's allowed CSG list. This does not prohibit a UE from performing measurement reporting on CSG cells and hybrid cells that are not included in this list.<br>hybridCellsToMeasureList |
| List of hybrid cells that the UE should perform measurement reporting based on reporting configuration specified for hybrid cells whose CSG IDs are not in the UE's allowed CSG list. This does not prohibit a UE from performing measurement reporting on hybrid cells that are not included in this list. |

In the case where the eNB instructs the UE to perform handover evaluation on a specific CSG or hybrid cell, such as a newly powered-on CSG or hybrid cell, the specific CSG or hybrid cell may be included in the allowedCsgHybridCellsToMeasureList above. The UE may use the reporting configuration that corresponds to allowed CSG cells or hybrid cells whose CSG IDs are in the UE's allowed CSG list, when determining if handover evaluation and reporting should be performed on the CSG cell or hybrid cell respectively. In the case where the eNB instructs the UE to perform handover evaluation on a specific hybrid cell, such as a newly powered-on hybrid cell, the specific hybrid cell may be included in the hybridCellsToMeasureList described above. The UE may use the reporting configuration that corresponds to hybrid cells whose CSG IDs are not in the UE's allowed CSG list, when determining if handover evaluation and reporting should be performed on the hybrid cell.

Figure 3A:
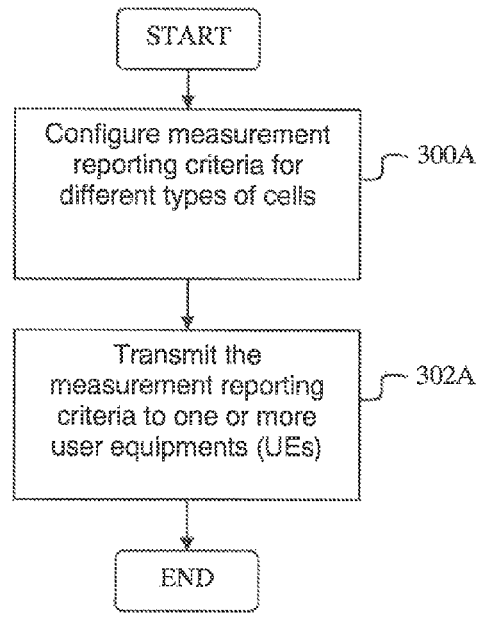
FIG. 3A is a flowchart illustrating a process of configuring and transmitting measurement reporting criteria, according to an embodiment of the disclosure.

FIG. 3A is a flowchart illustrating a process of configuring and transmitting measurement reporting criteria, according to an embodiment of the disclosure. The process shown in FIG. 3A may be implemented in a network device, such as access node 110 and access node 140, or RN 120 of FIG. 1, or in a device such as that shown in system 715 in FIG. 7.

The process begins as the network device configures measurement reporting criteria for different types of cells (block 300A). The network device then transmits, using a processor, the measurement reporting criteria to one or more user equipments (UEs) (block 300B). The process terminates thereafter.

Figure 3B:
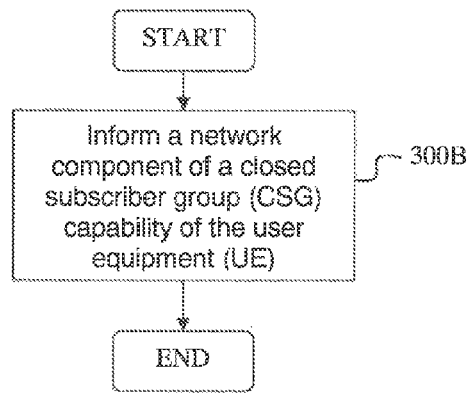
FIG. 3B is a flowchart illustrating a process of informing a network component of a UE's CSG capability, according to an embodiment of the disclosure.

FIG. 3B is a flowchart illustrating a process of informing a network component of a UE's CSG capability, according to an embodiment of the disclosure. The process shown in FIG. 3B may be implemented in a UE, such as UEs 130 of FIG. 1, or in a device such as that shown in system 715 in FIG. 7.

The process begins as the UE informs a network component of a dosed subscriber group (CSG) capability of the user equipment (UE) (block 300B). The process terminates thereafter.

Figure 3C:
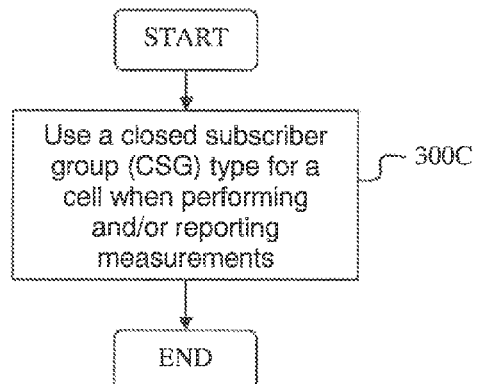
FIG. 3C is a flowchart illustrating a process of using a CSG type when performing and reporting measurements, according to an embodiment of the disclosure.

FIG. 3C is a flowchart illustrating a process of using a CSG type when performing and/or reporting measurements, according to an embodiment of the disclosure. The process shown in FIG. 3B may be implemented in a UE, such as UEs 130 of FIG. 1, or in a device such as that shown in system 715 in FIG. 7.

The process begins as the UE uses a closed subscriber group (CSG) type for a cell when performing and/or reporting measurements (block 300C). The process terminates thereafter.

Figure 3D:
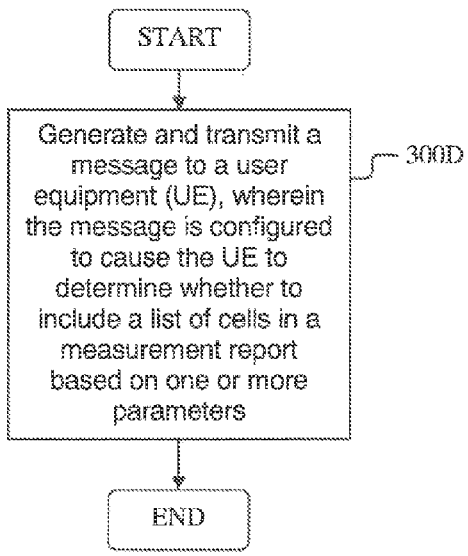
FIG. 3D is a flowchart illustrating a process of causing a UE to determine whether to include a list of cells in a measurement report, according to an embodiment of the disclosure.

FIG. 3D is a flowchart illustrating a process of causing a UE to determine whether to include a list of cells in a measurement report, according to an embodiment of the disclosure. The process shown in FIG. 3D may be implemented in a network device, such as access node 110 and access node 140, or RN 120 of FIG. 1, or in a device such as that shown in system 715 in FIG. 7.

The process begins as the network device generates and transmits a message to a user equipment (UE), wherein the message is configured to cause the UE to determine whether to include a list of cells in a measurement report based on one or more parameters (block 300D). The process terminates thereafter.

Figure 4:
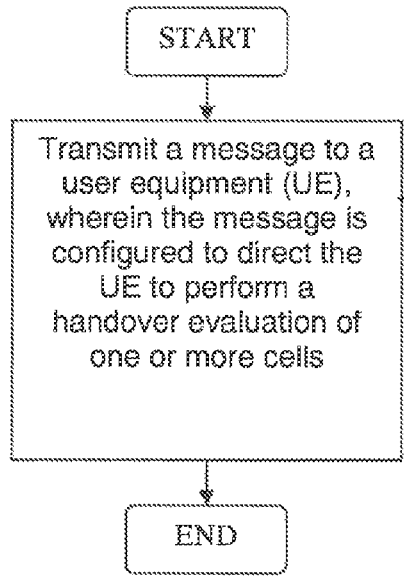
FIG. 4 is a flowchart illustrating a process of directing a UE to perform a handover evaluation one or more neighboring cells, according to an embodiment of the disclosure.

FIG. 4 is a flowchart illustrating a process of directing a UE to perform a handover evaluation of one or more cells, according to an embodiment of the disclosure. The process shown in FIG. 4 may be implemented in a network device, such as access node 110 and access node 140, or RN 120 of FIG. 1, or in a device such as that shown in system 715 in FIG. 7.

The process begins as the network device transmits a message to a user equipment (UE), wherein the message is configured to direct the UE to perform a handover evaluation of one or more cells (block 400). The process terminates thereafter.

Figure 5:
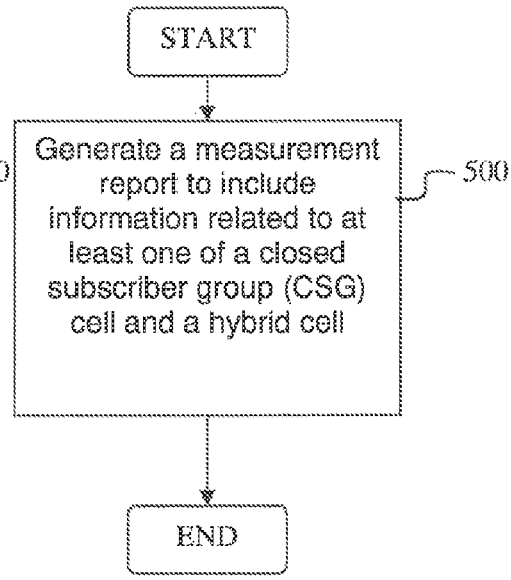
FIG. 5 is a flowchart illustrating a process of generating a measurement report to include information related to CSGs and hybrid cells, according to an embodiment of the disclosure.

FIG. 5 is a flowchart illustrating a process of generating a measurement report to include information related to CSGs and hybrid cells, according to an embodiment of the disclosure. The process shown in FIG. 5 may be implemented in a UE, such as UEs 130 of FIG. 1, or in a device such as that shown in system 715 in FIG. 7.

The process begins as the UE generates a measurement report to include information related to at least one of a closed subscriber group (CSG) cell and a hybrid cell (block 500). The process terminates thereafter.

Figure 6:
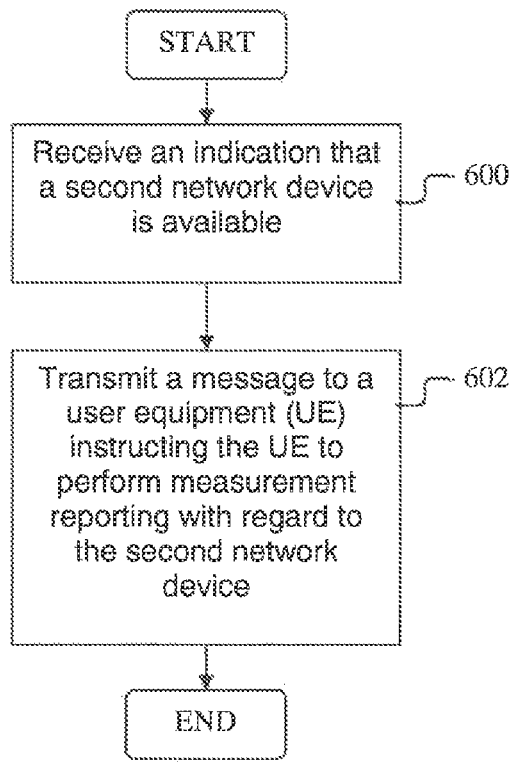
FIG. 6 is a flowchart illustrating a process of instructing a UE to perform measurement reporting with regard to a newly available network device, according to an embodiment of the disclosure.

FIG. 6 is a flowchart illustrating a process of instructing a UE to perform measurement reporting with regard to a (possibly newly) available network device, according to an embodiment of the disclosure. The process shown in FIG. 6 may be implemented in a network device, such as access node 110 and access node 140, or RN 120 of FIG. 1, or in a device such as that shown in system 715 in FIG. 7.

The process begins as the network device receives an indication that a second network device is available (block 600). The network device then transmits a message to a user equipment (UE) instructing the UE to perform measurement reporting with regard to the second network device (block 602). The process terminates thereafter.

Figure 7:
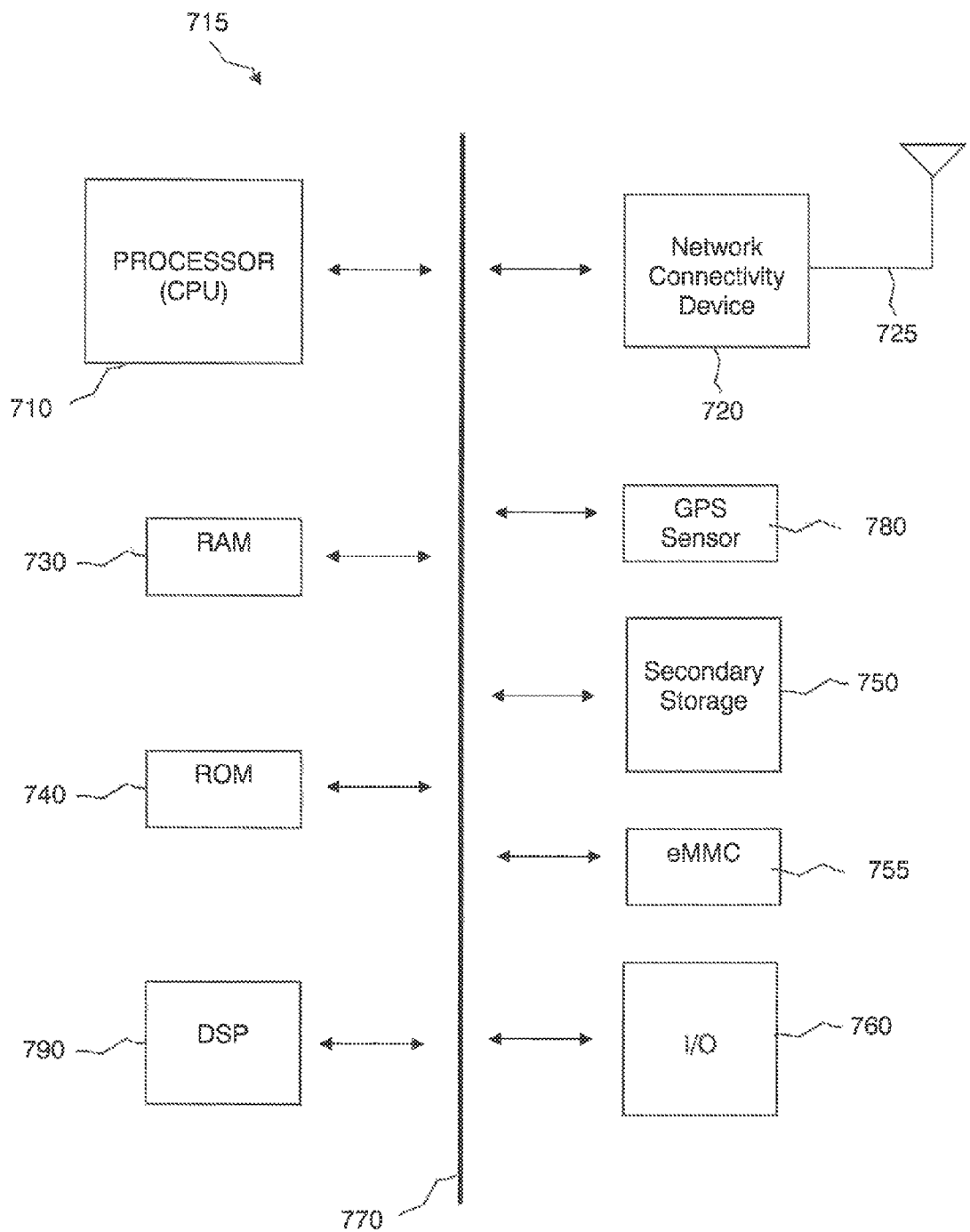
FIG. 7 illustrates an example of a system that includes a processing component suitable for implementing one or more embodiments disclosed herein.

The UE and other components described above might include a processing component that is capable of executing instructions related to the actions described above. FIG. 7 illustrates an example of a system 715 that includes a processing component, such as processor 710, suitable for implementing one or more embodiments disclosed herein. In addition to the processor 710 (which may be referred to as a central processor unit or CPU), the system 715 might include network connectivity devices 720, random access memory (RAM) 730, read only memory (ROM) 740, secondary storage 750, and input/output (I/O) devices 760. These components might communicate with one another via a bus 770. In some cases, some of these components may not be present or may be combined in various combinations with one another or with other components not shown. These components might be located in a single physical entity or in more than one physical entity. Any actions described herein as being taken by the processor 710 might be taken by the processor 710 alone or by the processor 710 in conjunction with one or more components shown or not shown in the drawing, such as a digital signal processor (DSP) 790. Although the DSP 790 is shown as a separate component, the DSP 790 might be incorporated into the processor 710.

The processor 710 executes instructions, codes, computer programs, or scripts that it might access from the network connectivity devices 720, RAM 730, ROM 740, or secondary storage 750 (which might include various disk-based systems such as hard disk, floppy disk, or optical disk). While only one CPU 710 is shown, multiple processors may be present. Thus, while instructions may be discussed as being executed by a processor, the instructions may be executed simultaneously, serially, or otherwise by one or multiple processors. The processor 710 may be implemented as one or more CPU chips.

The network connectivity devices 720 may take the form of modems, modem banks. Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 720 may enable the processor 710 to communicate with the Internet or one or more telecommunications networks or other networks from which the processor 710 might receive information or to which the processor 710 might output information. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that typically has a smaller memory capacity than the memory capacity of the secondary storage 750, ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 725 might be considered to be a component of the I/O devices 760 instead of or in addition to being a component of the network connectivity devices 720.

The following documents are hereby incorporated by reference in theft entireties:

R2-095342, "Draft CR capturing HeNB inbound mobility agreements," Motorola, Deutsche Telekom, Interdigital, Oualcomm, Vodafone, Telecom-Italia, Nokia-Siemens Networks, Panasonic, August 2009.

R2-094632, "[66b#5] UMTSLTE: Inbound CSG mobility LTE," Motorola (Rapporteur), August 2009.

R2-094820, "UMTSLTE: Inbound CSG mobility UMTS," Qualcomm (Rapporteur), August 2009.

R2-094808, "[66b#6] UMTS-LTE: Hybrid cells," Email Discussion Rapporteur (Qualcomm), August 2009.

R2-094651, "Measurements to support handover to CSG and Hybrid cells," Motorola, August 2009.

R2-094767, "Handover evaluation to CSG cell," ZTE, August 2009.

3GPP TS 36.331, v8.6.0, "Evolved Universal Terrestrial Radio Access (E-UTRA) Radio Resource Control (RRC); Protocol specification (Release 8)," June 2009.

3GPP TS 36.304, v8.6.0, "Evolved Universal Terrestrial Radio Access (E-UTRA); User Equipment (UE) procedures in idle mode (Release 8)," June 2009.

3GPP TS 25.304, v8.6.0, "User Equipment (UE) procedures in idle mode and procedures for cell reselection in connected mode (Release 8)," June 2009.

In an embodiment, a network component may comprise a processor to configure measurement reporting criteria for different types of cells, and further to transmit the measurement reporting criteria to one or more user equipments (UEs). The network component may comprise an Evolved Universal Terrestrial Radio Access Network Node B (eNB). The different types of cells may comprise one or more of the group consisting of: a closed subscriber group (CSG) cell, a hybrid cell, a CSG cell associated with a geographical location, a CSG cell in a high mobility environment, and a macro cell. The processor may configure the different measurement reporting criteria, wherein the different measurement reporting criteria may comprise one or more of the group consisting of: a parameter relating to one of a Reference Signal Received Power (RSRP) threshold and a Reference Signal Received Quality (RSRQ) threshold, a filter coefficient value relating to one of a RSRP measurement and an RSRQ measurement, a cell type, a closed subscriber group (CSG) cell type, and an indication of a level of UE mobility. The processor may transmit multiple measurement reporting criteria to a single UE, wherein the multiple measurement reporting criteria are configured in multiple measurement identities.

In an embodiment, a user equipment (UE) may comprise a processor configured to inform a network component of a closed subscriber group (CSG) capability of the UE. The processor may inform the network component during capability exchange signaling. The processor may inform the network whether the UE is capable of detecting a CSG cell and whether the UE is a member of at least one CSG. The processor may receive a configured measurement reporting criteria from the network component, and the processor may configure the UE according to the measurement reporting criteria.

In an embodiment, a user equipment (UE) may comprise a processor configured to use a dosed subscriber group (CSG) type for a cell when performing and reporting measurements. The processor may map a CSG identification (ID) of a CSG cell to a CSG type of the CSG cell. The processor may check the CSG identification (ID) of a neighbor cell and verify if the CSG ID is provisioned for a particular CSG type in a CSG list stored in the UE, and the processor may transmit a measurement report if the check is positive and if other existing configured measurement reporting criteria are met. The cell may be at least one of a serving cell and a neighbor cell. The type may indicate at least one of a capability of the cell and an expected usage of the cell. The type may be associated with a physical layer identity.

In an embodiment, a network component may comprise a processor configured to generate and transmit a message to a user equipment (UE). The message may be configured to cause the UE to determine whether to send a measurement report to the network component based on whether one or more cells belong to one or more lists of Closed Subscriber Groups (CSGs). The processor may generate and transmit a message to a user equipment (UE), the message may cause the UE to determine whether to include a list of cells in a measurement report based on one or more parameters. The one or more parameters may comprise at least one of a list of cells for which the UE receives the strongest signals, a priority level of a set of cells which the UE can detect, and a combination thereof. The one or more parameters may comprise at least one of a list of macro cells for which the UE receives the strongest signals, a list of closed subscriber group (CSG) cells for which the UE receives the strongest signals, a list of hybrid cells for which the UE receives the strongest signals, and a combination thereof. The one or more parameters may comprise a neighbor cell signal strength threshold below which the UE shall not include a cell in the measurement report.

In an embodiment, a method may be implemented a network component, the method may comprise configuring, using a processor, measurement reporting criteria for different types of cells; and transmitting, using a processor, the measurement reporting criteria to one or more user equipments (UEs).

In an embodiment, a method may be implemented in a user equipment (UE), the method may comprise informing, using a processor, a network component of a closed subscriber group (CSG) capability of the UE.

In an embodiment, a method may be implemented in a user equipment (UE), the method may comprise using, by a processor, a closed subscriber group (CSG) type for a cell when performing and reporting measurements.

In an embodiment, a method may be implemented in a network component, the method may comprise generating and transmitting, with a processor, a message to a user equipment (UE), wherein the message is configured to cause the UE to determine whether to include a list of cells in a measurement report based on one or more parameters.

In an embodiment, a network component may comprise a processor configured to transmit a message to a user equipment (UE), the message may direct the UE to perform a handover evaluation one or more cells neighboring the network component. The processor may receive from the UE a measurement report of one or more members of the group, and the processor may determine whether the one or more members are closed subscriber group (CSG) cells based on physical cell identity (PCI) values included in the measurement report. The determination may be based on a PCI split. The message may be based on at least one of a signal strength of a neighbor cell previously reported by the UE, whether the network component has stored closed subscriber group (CSG) cell related information of a neighbor cell that maps to an identified physical cell identify (PCI), and CSG neighbor cell information received from a mobility management entity (MME). The message may be based on an inference from measurement reports provided by the UE and a measurement configuration applicable to the UE. The message may be based on at least one of 1) whether a neighbor CSG cell is in a preferred or allowed CSG list of the UE and 2) whether a neighbor CSG cell is in an area that corresponds to a CSG type. The message may be based on a neighbor cell not being in a CSG list of the UE. The message may instruct the UE to perform the handover evaluation on a cell without a prior signal strength report from the UE. Autonomous gaps may be used for the handover evaluation. A corresponding physical cell identify (PCI) of each neighbor cell may be included in an information element transmitted to the UE. The message may be further configured to instruct the UE regarding which neighbor cells the UE should perform the handover evaluation for. The message may be further configured to instruct the UE to perform the handover evaluation for a particular number of cells for which the UE received the strongest signal strengths. Scheduled gaps may be used for the handover evaluation. The processor may inform the UE of at least one of radio frames or radio sub-frames used for the handover evaluation. The message may be further configured to direct the UE to consider the scheduled gaps for a particular neighbor cell to be released after the UE has acquired a master information block (MIB) and a system information block (SIB)-1.

In an embodiment a method may be implemented in a network component, the method may comprise transmitting, using a processor, a message to a user equipment (UE), the message may be configured to direct the UE to perform a handover evaluation one or more cells neighboring the network component.

In an embodiment, a user equipment (UE) may comprise a processor configured to generate a measurement report to include information related to at least one of a closed subscriber group (CSG) cell and a hybrid cell. The processor may generate the measurement report to include an indication whether a particular neighbor cell measured by the UE belongs to an allowed CSG. The processor may generate the measurement report to include an indication whether a particular neighbor cell measured by the UE belongs to a preferred CSG. The processor may generate the measurement report to include an indication whether a particular neighbor cell measured by the UE belongs to one of a particular provisioned area and a particular provisioned environment. The processor may generate the measurement report to include an indication whether a particular neighbor cell measured by the UE belongs to a type of CSG. The measurement report may report a CSG identity (ID) of a neighbor cell if the neighbor cell is one of the CSG cell and the hybrid cell. The measurement report may include an indication of whether a neighbor cell is a CSG cell or hybrid cell. The processor may generate the measurement report to include an indication of whether information related to the at least one of the CSG cell and the hybrid cell is obtained based on a handover evaluation performed within a predefined duration prior to when the measurement report is sent. The processor may avoid placing handover preparation information of a cell in the measurement report when the handover preparation information is obtained outside of the predefined duration. The predefined duration may be received from the network component. The processor may assign a priority level to a CSG cell entry in an allowed CSG list stored in the UE, and the processor may transmit the priority level of the CSG cell entry to a network component. The processor may assign the priority level based on a type of the CSG cell associated with the CSG cell entry.

In an embodiment, a method may be implemented in a user equipment (UE), the method may comprise generating, with a processor, a measurement report to include information related to at least one of a closed subscriber group (CSG) cell and a hybrid cell.

In an embodiment, a network component may comprise a processor, configured to receive one or more triggers and thereafter to transmit a message to a user equipment (UE) instructing the UE to perform measurement reporting with regard to a second network component. The network component may comprise a macro network component and the second network component may comprise one of a home evolved universal terrestrial radio access network component (HeNB), a microcell network component, and a femtocell network component. The message may further instruct the UE to perform measurement reporting of a particular neighbor closed subscriber group (CSG) cell using reporting configuration and trigger criteria specified for allowed CSG cells. The message may further instruct the UE to perform measurement reporting of a particular neighbor hybrid cell using reporting configuration and trigger criteria specified for hybrid cells. The one or more triggers may include an indication that the second network component has become available. The one or more triggers may include an indication that the UE does not contain fingerprinting information of a CSG or hybrid cell. The one or more triggers may include an indication that the outer cell interference received at the network component is high. The second network component may have become available because the second network component is powered on. The message may further instruct the UE to perform handover evaluation of the second network component.

In an embodiment, a method may be implemented in a network component, the method may comprise receiving, by a processor, an indication that a second network component has become available; and thereafter transmitting, by a processor, a message to a user equipment (UE) instructing the UE to perform measurement reporting with regard to the second network component.

In an embodiment, a user equipment (UE) may comprise a processor configured to inform a network component of a closed subscriber group (CSG) capability of the UE.

In an embodiment, a method comprising may comprise informing a network component, by a user equipment (UE) of a closed subscriber group (CSG) capability of the UE.

In an embodiment, a network component may comprise a processor configured to receive a closed subscriber group (CSG) capability from a user equipment (UE).

In an embodiment, a user equipment (UE) may comprise an allowed closed subscriber group (CSG) list; and a processor, configured to receive a trigger to perform a measurement of at least one cell, wherein the measurement comprises acquiring a CSG identity (ID) of the cell, if the cell broadcasts the CSG ID determining whether the CSG ID is in the allowed CSG list; and indicating whether the UE is a member of the cell in a measurement report.

In an embodiment, a network component may comprise a processor configured to transmit a trigger to a user equipment (UE) to perform measurement of a cell, wherein the trigger is configured to direct the UE to perform a handover evaluation of one or more neighboring cells.

In an embodiment, a method may comprise receiving at a user equipment (UE) a trigger to perform a measurement of at least one cell, wherein the measurement comprises acquiring a dosed subscriber group (CSG) identity (D) of the cell, if the cell broadcasts the CSG ID; determining whether the CSG ID is in an allowed CSG list; and Indicating whether the UE is a member of the cell in a measurement report.

In an embodiment, a network component may comprise a processor, configured to receive one or more triggers and thereafter to transmit a message to a user equipment (UE) instructing the UE to perform measurement reporting with regard to a second network component.

In an embodiment, a method may comprise receiving, by a network component, an indication that a second network component has become available; and thereafter transmitting, by the network component, a message to a user equipment (UE) instructing the UE to perform measurement reporting with regard to the second network component, wherein the network component comprises a macro network component and wherein the second network component comprises one of a home evolved universal terrestrial radio access network component (HeNB), a microcell network component, and a femtocell network component.

In an embodiment, a network component may comprise a processor, configured to transmit a trigger to a user equipment (UE) to perform a measurement of at least one cell; wherein the measurement comprises: acquiring a closed subscriber group (CSG) identity (ID) of the cell, if the cell broadcasts the CSG ID; determining whether the CSG ID is in the allowed CSG list; and indicating whether the UE is a member of the cell in a measurement report.

In an embodiment, a user equipment (UE) may comprise a processor, configured to receive a measurement reporting criteria comprising at least one signal strength criterion; and an allowed closed subscriber group (CSG) list.

In an embodiment, a user equipment (UE) may comprise a processor configured to generate a measurement report to include information related to at least one of a closed subscriber group (CSG) cell and a hybrid cell.

In an embodiment, a method may comprise receiving, by a user equipment (UE) a measurement reporting criteria comprising at least one signal strength criterion; and sending a measurement report comprising measurement results of a CSG cell when the at least one signal strength criterion of the CSG cell are met and the CSG cell is in an allowed CSG list.

In an embodiment, a network component may comprise a processor, configured to: transmit a measurement reporting criteria comprising at least one signal strength criterion; and receive a measurement report comprising measurement results of a CSG cell when the at least one signal strength criterion of the CSG cell are met and the CSG cell is in an allowed closed subscriber group (CSG) list of a user equipment (UE).

In an embodiment, a user equipment (UE) may comprise a processor configured to receive a measurement configuration comprising different measurement reporting criteria for different types of cells.

In an embodiment, a user equipment (UE) may comprise a processor configured to receive a measurement configuration comprising one or more measurement identities for: signal quality measurement, or performing system information reading and CSG information acquisition.

In an embodiment, a network component may comprise a processor to configured to transmit a measurement configuration comprising different measurement reporting criteria for different types of cells.

In an embodiment, a network component may comprise a processor configured to transmit a measurement configuration comprising one or more measurement identities for: signal quality measurement, or performing system information reading and closed subscriber group (CSG) information acquisition.

In an embodiment, a method may comprise receiving at a user equipment (UE) a measurement configuration comprising different measurement reporting criteria for different types of cells, wherein each of the plurality of cells corresponds to one of a plurality of cell types, and wherein the different types of cells comprises at least one of the group consisting of: a closed subscriber group (CSG) cell, a hybrid cell, a CSG cell associated with a geographical location, a CSG cell in a high mobility environment, and a macro cell.

In an embodiment, a method may comprise receiving at a user equipment a measurement configuration comprising one or more measurement identities for; signal quality measurement, or performing system information reading, and CSG information acquisition; and performing system information reading and CSG information acquisition on a cell when indicated in one of the measurement identities.

The embodiments contemplate one or more computer readable media. The term "computer readable medium" refers to a tangible storage device which can store data and from which a processor or other electronic device may read data. However, the embodiments may also be embodied on transmission media, such as carrier waves. The embodiments may also be implemented in the form of a processor configured to perform the techniques described herein. A processor may be configured to perform a technique either by programming the processor with software, by physically designing a processor to perform a particular function, such as in the form of an application specific integrated circuit (ASIC), or by using other techniques well known to those skilled in the art.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE) comprising:
   a memory storing an allowed closed subscriber group (CSG) list;
   a transceiver configured to receive a measurement reporting criteria from a network component, the measurement reporting criteria specifying a signal strength criterion including a reference signal received power (RSRP) threshold, a reference signal received quality (RSRQ) threshold, or both; and
   a processor configured to:
      determine if a CSG cell is included in the allowed CSG list;
      determine if at least one of the RSRP threshold and the RSRQ threshold is met with respect to the CSG cell; and
      only upon determining that the CSG cell is included in the allowed CSG list and that at least one of the RSRP threshold and the RSRQ threshold is met with respect to the CSG cell: (i) generate a measurement report that includes measurement results of the CSG cell and (ii) cause the transceiver to send the measurement report to the network component.

2. The UE of claim 1, wherein the measurement reporting criteria further specifies a maximum number of non-CSG cells that can be included in the measurement report.

3. The UE of claim 2, wherein the measurement report includes measurement results associated with said maximum number of non-CSG cells.

4. A network component comprising:
   a processor configured to generate a measurement reporting criteria that specifies a signal strength criterion criteria including a reference signal received power (RSRP) threshold, a reference signal received quality (RSRQ) threshold, or both; and
   a transceiver configured to send the measurement reporting to a user equipment (UE), the transceiver being further configured to send instructions configuring the UE to:
      determine if a closed subscriber group (CSG) cell is included in the allowed CSG list;
      determine if at least one of the RSRP threshold and the RSRQ threshold is met with respect to the CSG cell; and
      only upon determining that the CSG cell is included in the allowed CSG list and that at least one of the RSRP threshold and the RSRQ threshold is met with respect to the CSG cell: (i) generate a measurement report of the CSG cell and (ii) send the measurement report to the network component.

5. The network component of claim 4, wherein the measurement reporting criteria further specifies a maximum number of non-CSG cells that can be included in the measurement report.

6. The network component of claim 5, wherein a measurement report that is received by the transceiver includes measurement results associated with said maximum number of non-CSG cells.

7. A non-transitory computer-readable medium storing instructions which are configured to cause a network component to perform operations of a method, the non-transitory computer-readable medium comprising:
   first instructions configured to cause a processor to generate a measurement reporting criteria that specifies a signal strength criterion including a reference signal received power (RSRP) threshold, a reference signal received quality (RSRQ) threshold, or both; and
   second instructions configured to cause a transceiver to send the measurement reporting criteria to a user equipment (UE), the second instructions being further configured to configure the UE to:
      determine if a closed subscriber group (CSG) cell is included in the allowed CSG list;
      determine if at least one of the RSRP threshold and the RSRQ threshold is met with respect to the CSG cell; and
      only upon determining that the CSG cell is included in the allowed CSG list and that at least one of the RSRP threshold and the RSRQ threshold is met with respect to the CSG cell: (i) generate a measurement report of the CSG cell and (ii) send the measurement report to the network component.

8. The computer-readable medium of claim 7, wherein the measurement reporting criteria further specifies a maximum number of non-CSG cells that can be included in the measurement report.

9. The computer-readable medium of claim 8, wherein a measurement report that is received, relative to sending of the measurement reporting criteria, includes measurement results associated with said maximum number of non-CSG cells.

* * * * *